(12) United States Patent
Uchida

(10) Patent No.: US 9,698,873 B2
(45) Date of Patent: Jul. 4, 2017

(54) POWER TRANSMISSION DEVICE AND POWER TRANSMISSION AND RECEPTION SYSTEM

(71) Applicant: FUJITSU LIMITED, Kawasaki-shi, Kanagawa (JP)

(72) Inventor: Akiyoshi Uchida, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 539 days.

(21) Appl. No.: 14/326,748

(22) Filed: Jul. 9, 2014

(65) Prior Publication Data
US 2014/0312702 A1    Oct. 23, 2014

Related U.S. Application Data

(63) Continuation of application No. PCT/JP2012/058697, filed on Mar. 30, 2012.

(30) Foreign Application Priority Data

Jan. 12, 2012   (JP) .................................. 2012-004011

(51) Int. Cl.
*H04B 5/00*   (2006.01)
*H02J 17/00*  (2006.01)
*H02J 7/02*   (2016.01)

(52) U.S. Cl.
CPC ............ *H04B 5/0037* (2013.01); *H02J 17/00* (2013.01); *H02J 7/025* (2013.01); *Y10T 307/696* (2015.04)

(58) Field of Classification Search
CPC .................................................. H04B 5/0037
(Continued)

(56) References Cited

U.S. PATENT DOCUMENTS

2013/0043738 A1* 2/2013 Park .................... H04M 1/7253
                                                        307/104

FOREIGN PATENT DOCUMENTS

JP   2008-283789    11/2008
JP   2008-283790    11/2008
(Continued)

OTHER PUBLICATIONS

Notification of Transmittal of Translation of the International Preliminary Report on Patentability (Form PCT/IB338, Form PCT/IB/373 & Form PCT/ISA/237), PCT/JP2012/058697 (6 pages), dated Jul. 24, 2014.

(Continued)

*Primary Examiner* — Joseph Chang
(74) *Attorney, Agent, or Firm* — Fujitsu Patent Center

(57) ABSTRACT

A power transmission device has: a plurality of power transmission units which perform wireless power transmission of strong-coupling system; a communication unit which, when the plurality of power transmission units transmit power at different timings to a power reception device, receives from the power reception device a plurality of reception power values of power each received by the power reception device and posture information of the power reception device; and a control unit which calculates a plurality of efficiencies based on power values of power transmitted by the plurality of power transmission units and the received plurality of reception power values, obtains a plurality of equal efficiency surfaces with respect to the plurality of power transmission units based on the plurality of efficiencies and the received posture information, and estimates that the power reception device is present at a position where the plurality of equal efficiency surfaces intersect.

11 Claims, 25 Drawing Sheets

(58) Field of Classification Search
USPC .......................................................... 307/80
See application file for complete search history.

(56) References Cited

FOREIGN PATENT DOCUMENTS

| JP | 2008-283791 | 11/2008 |
|---|---|---|
| JP | 2008-283792 | 11/2008 |
| JP | 2011-199975 | 10/2011 |

OTHER PUBLICATIONS

International Search Report, mailed in connection with PCT/JP2012/058697 and mailed Jun. 12, 2012.

* cited by examiner

F I G. 2
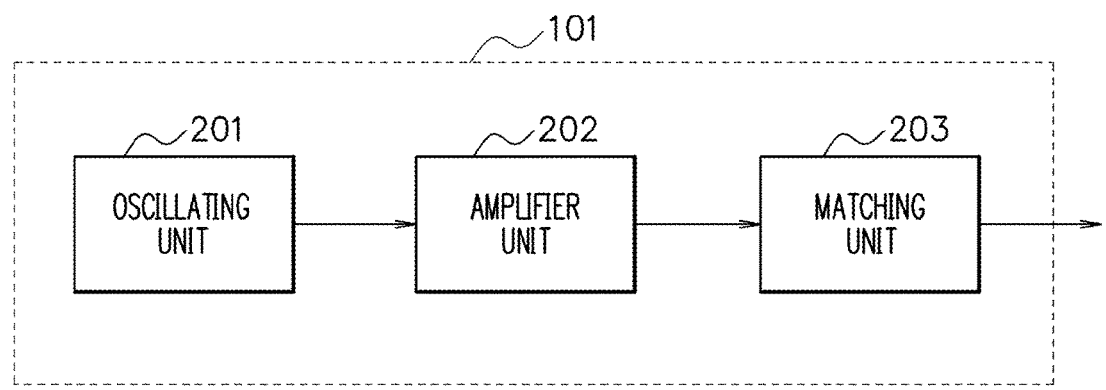

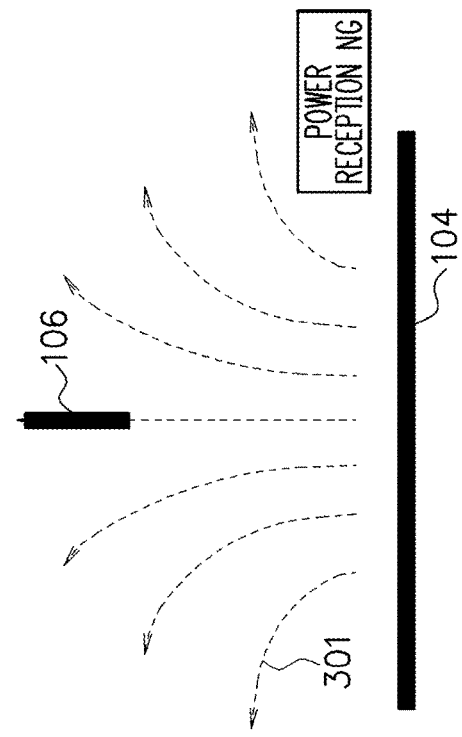
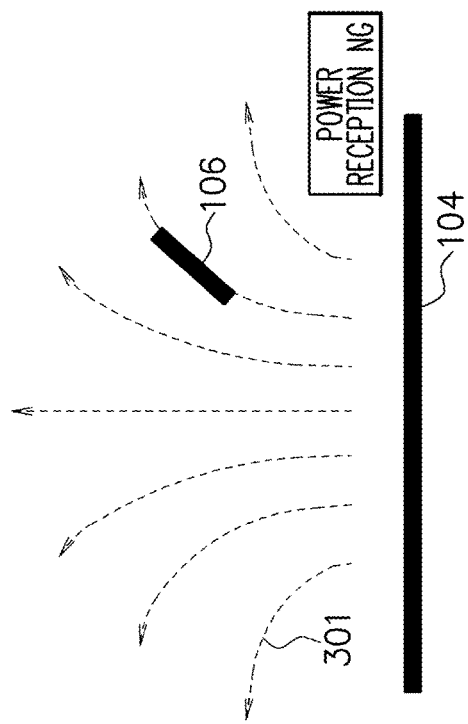
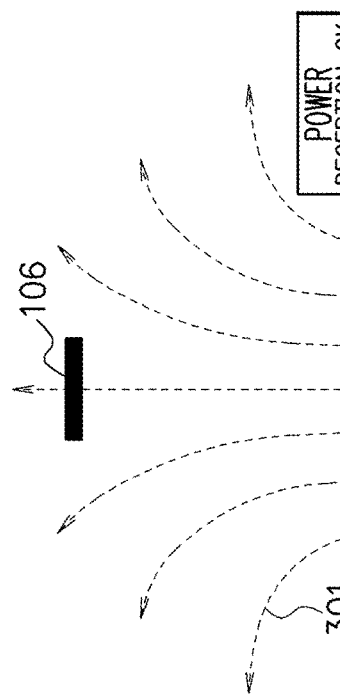
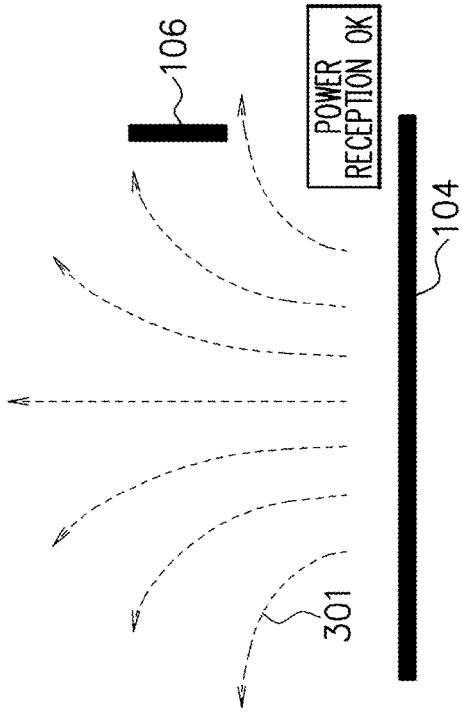

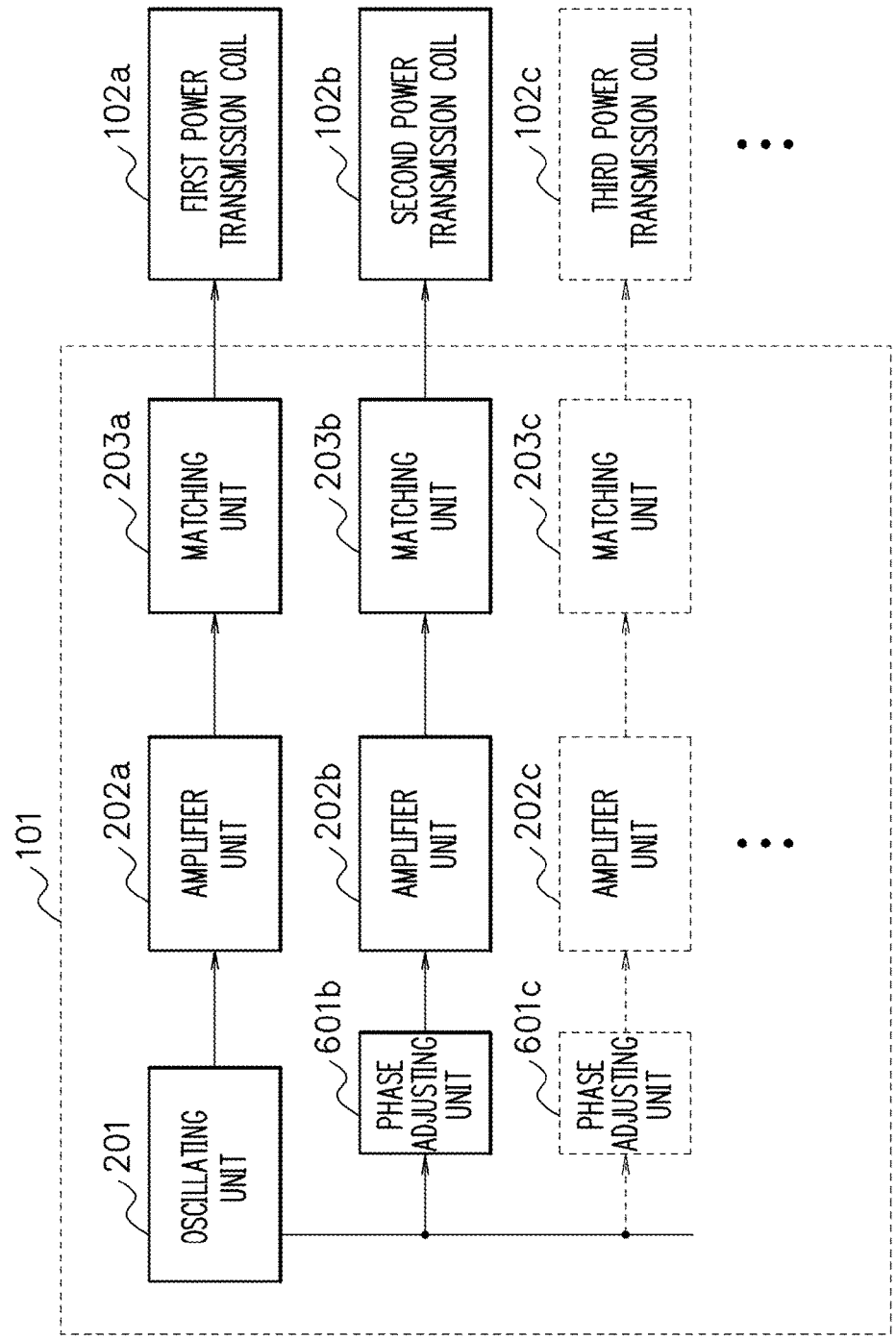

F I G. 7A
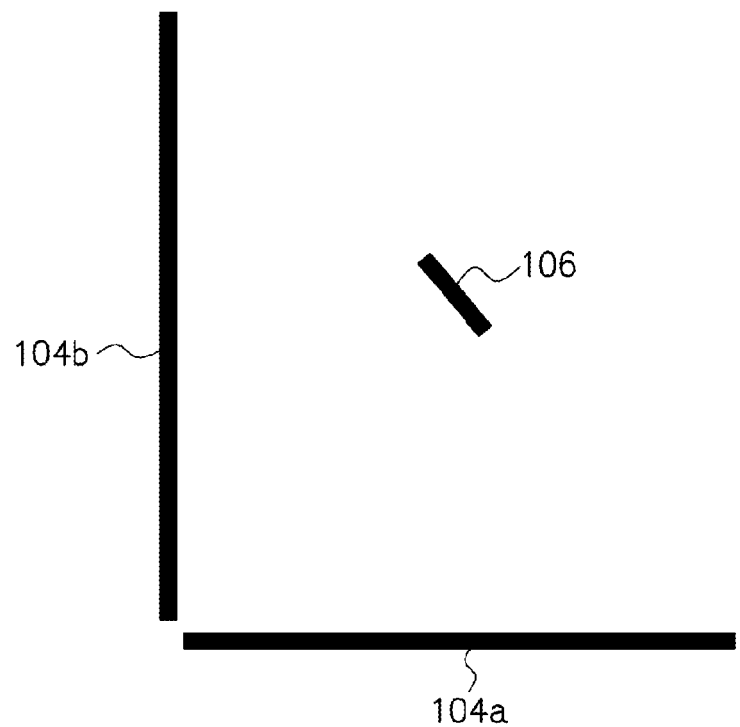
F I G. 7B
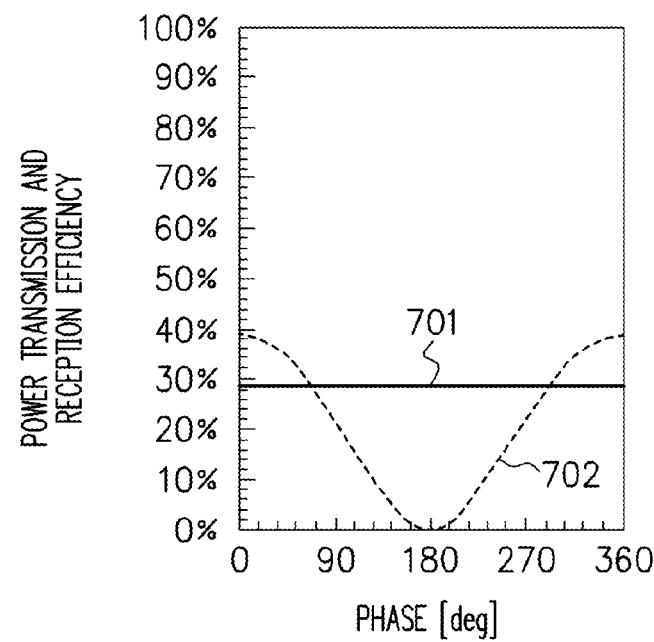

F I G. 10A
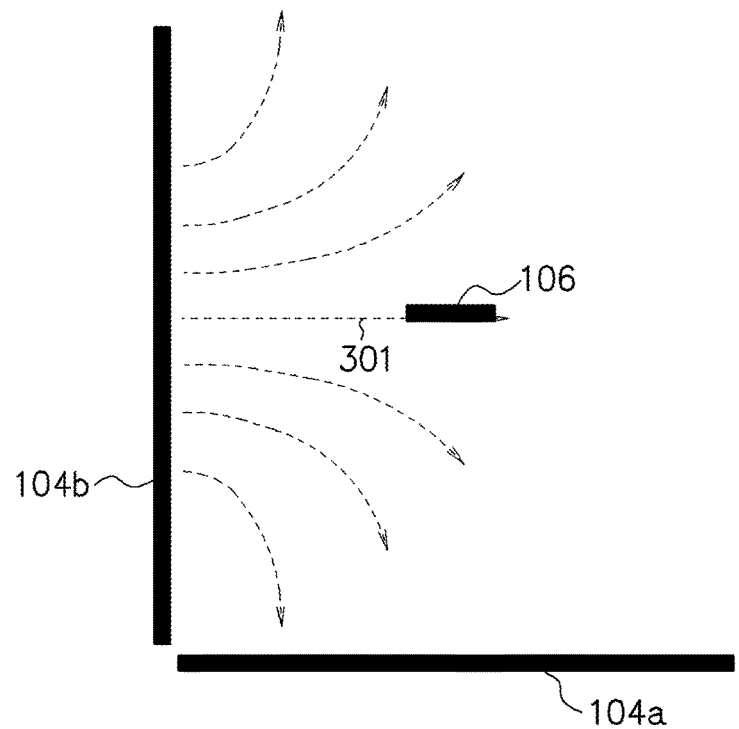
F I G. 10B
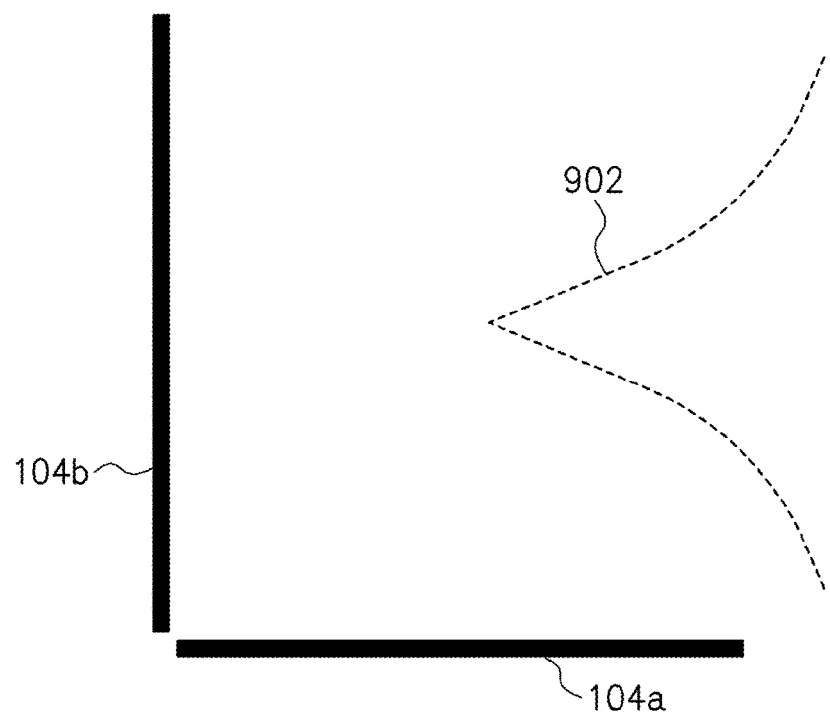

F I G. 13
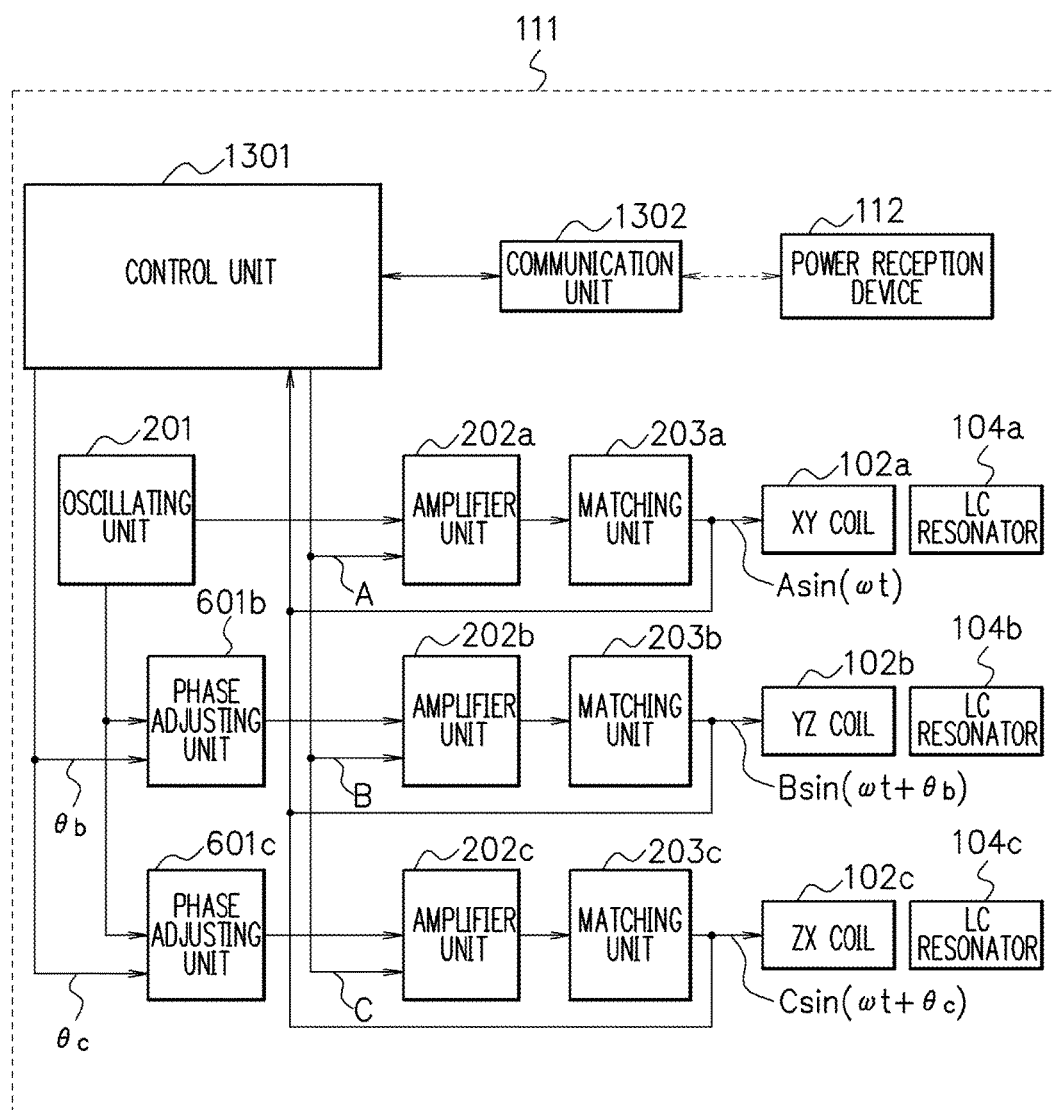

F I G. 14
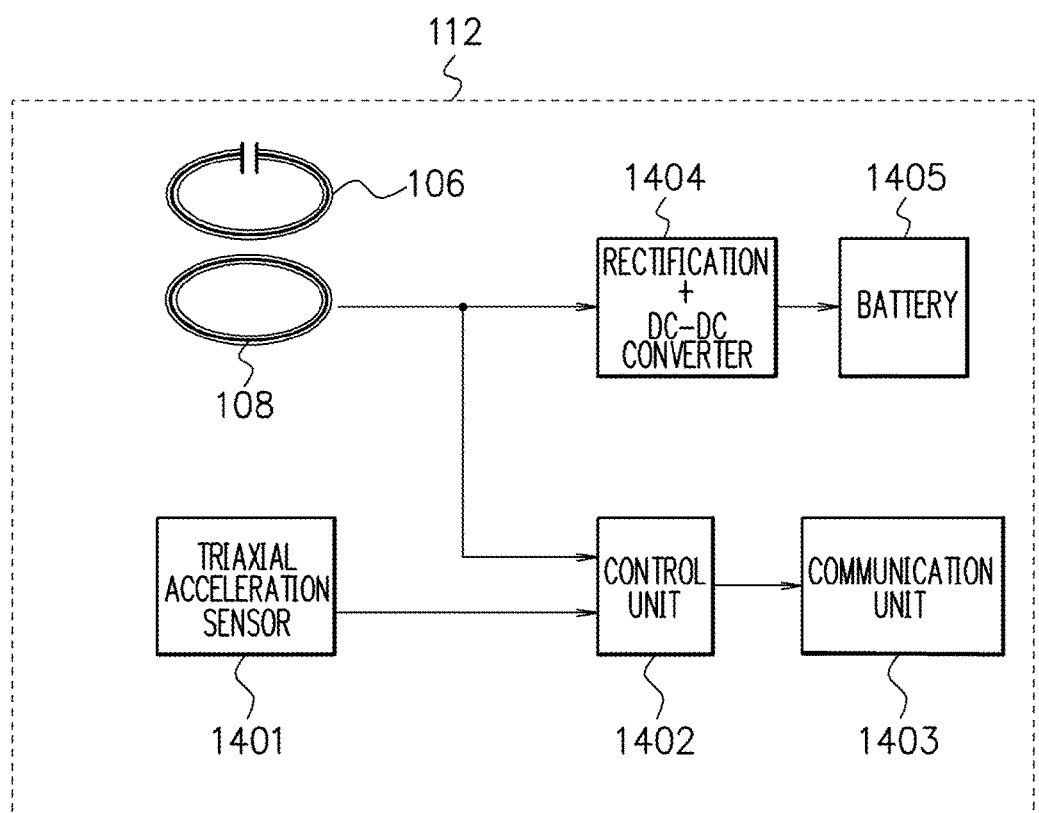

F I G. 16
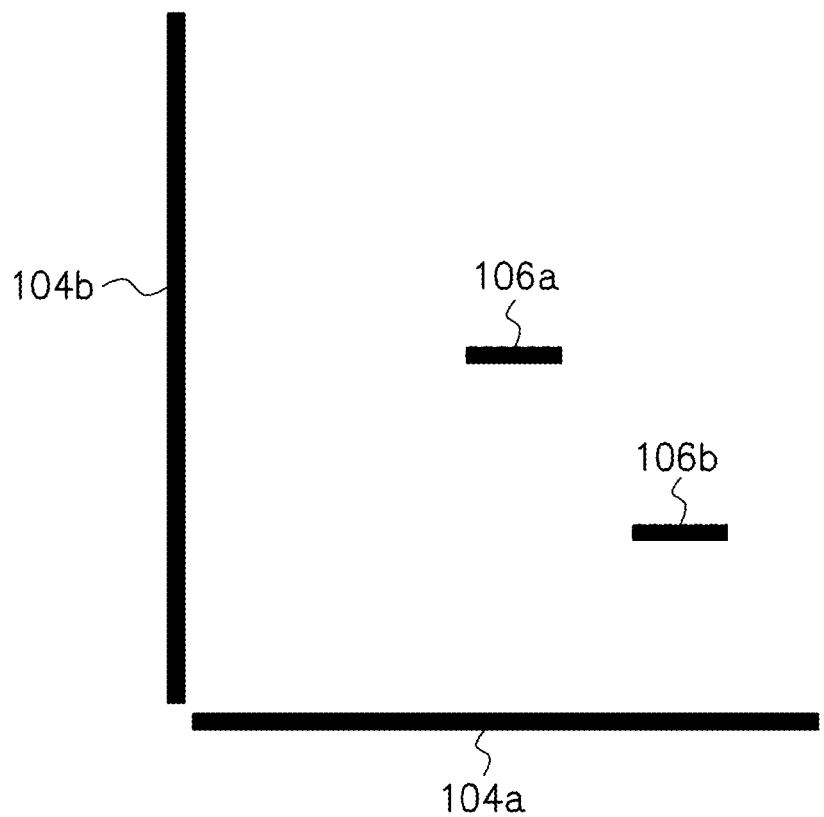

F I G. 17A
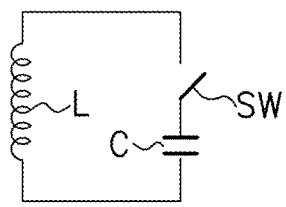
F I G. 17B
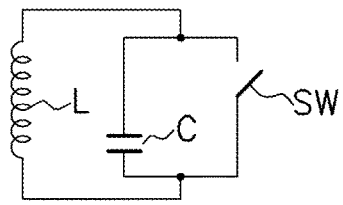
F I G. 17C
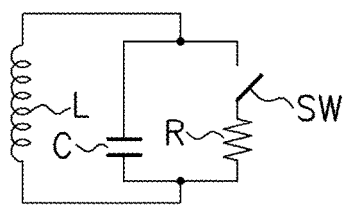
F I G. 17D
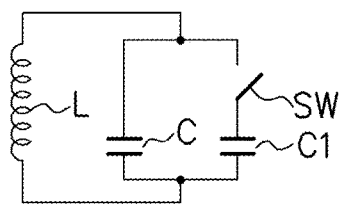

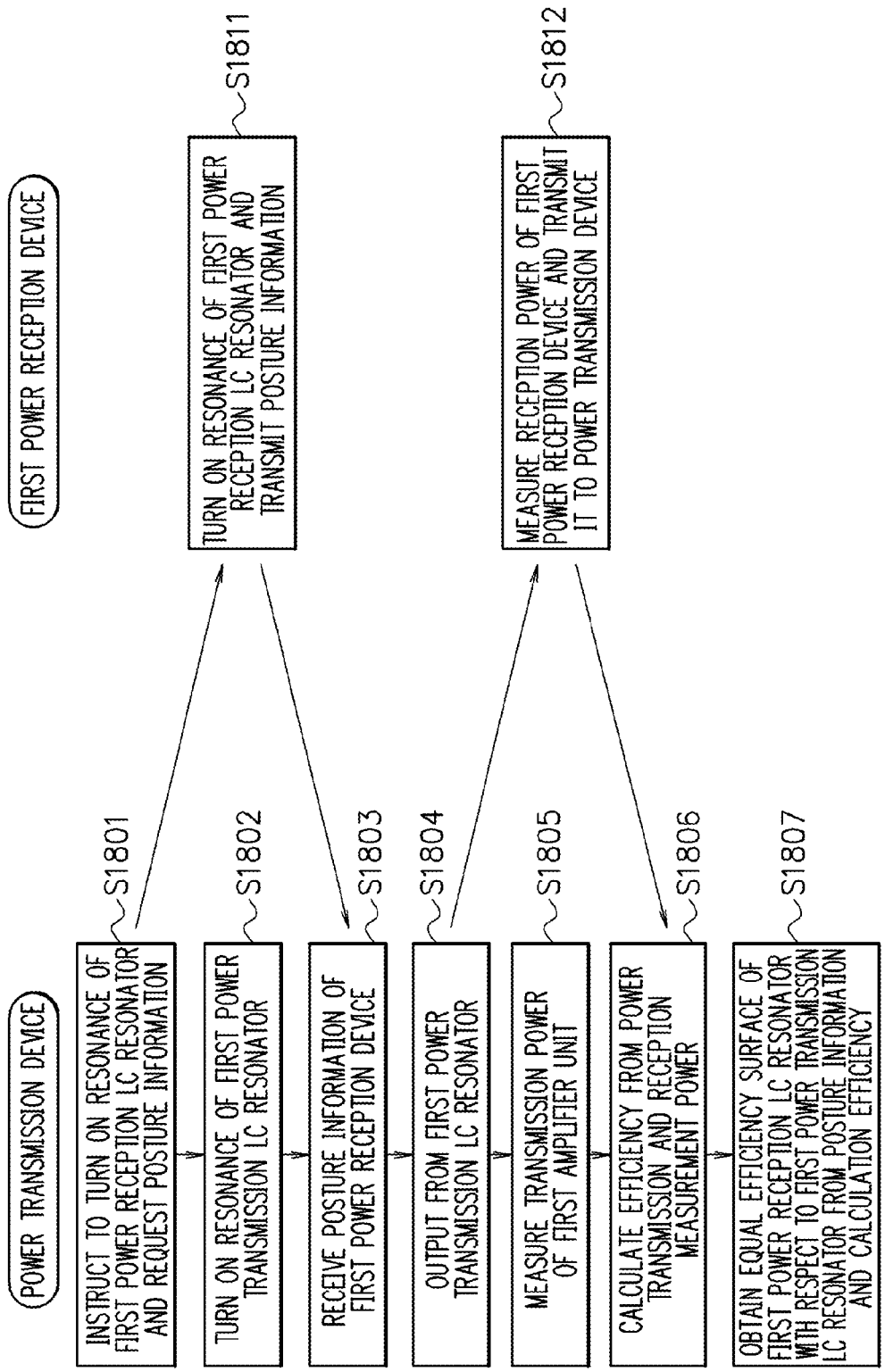

F I G. 19A
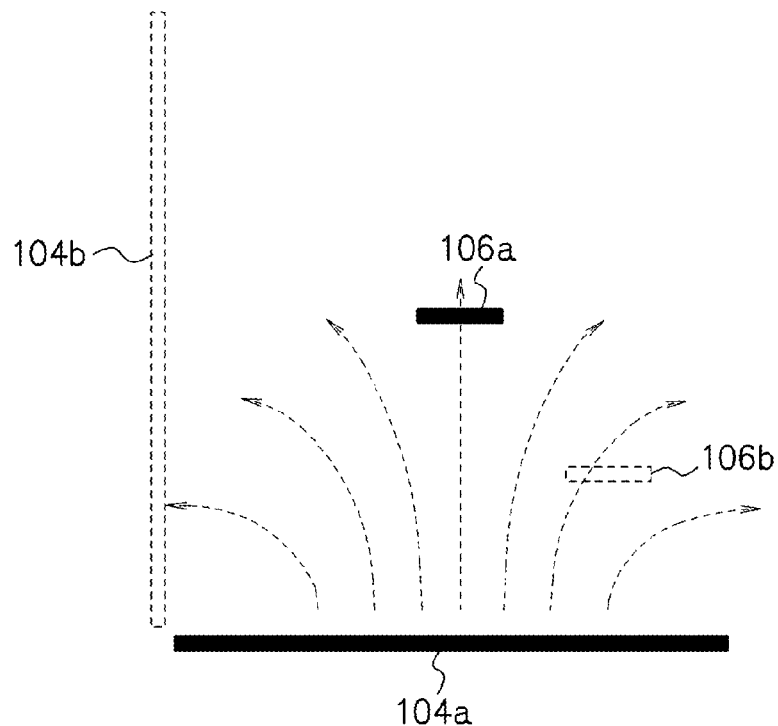
F I G. 19B
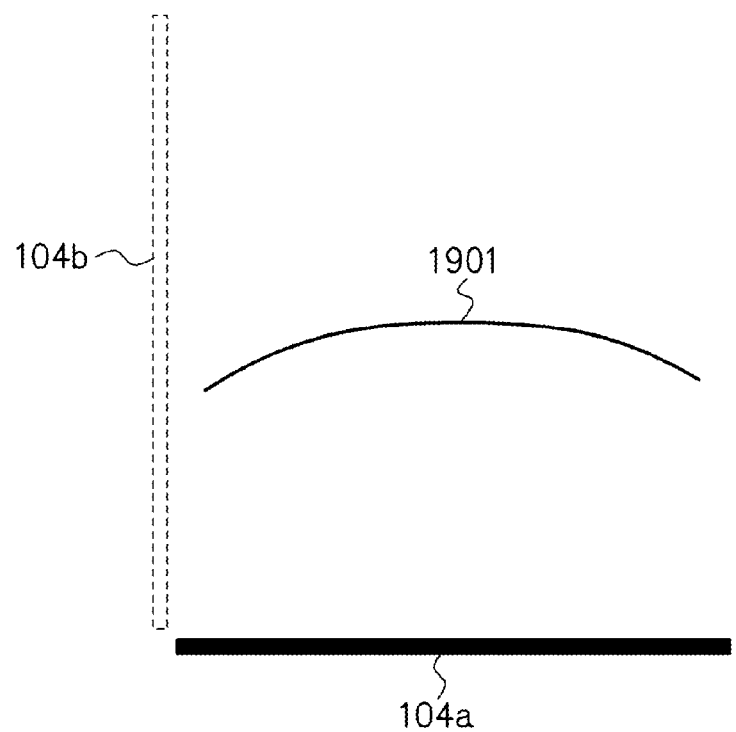

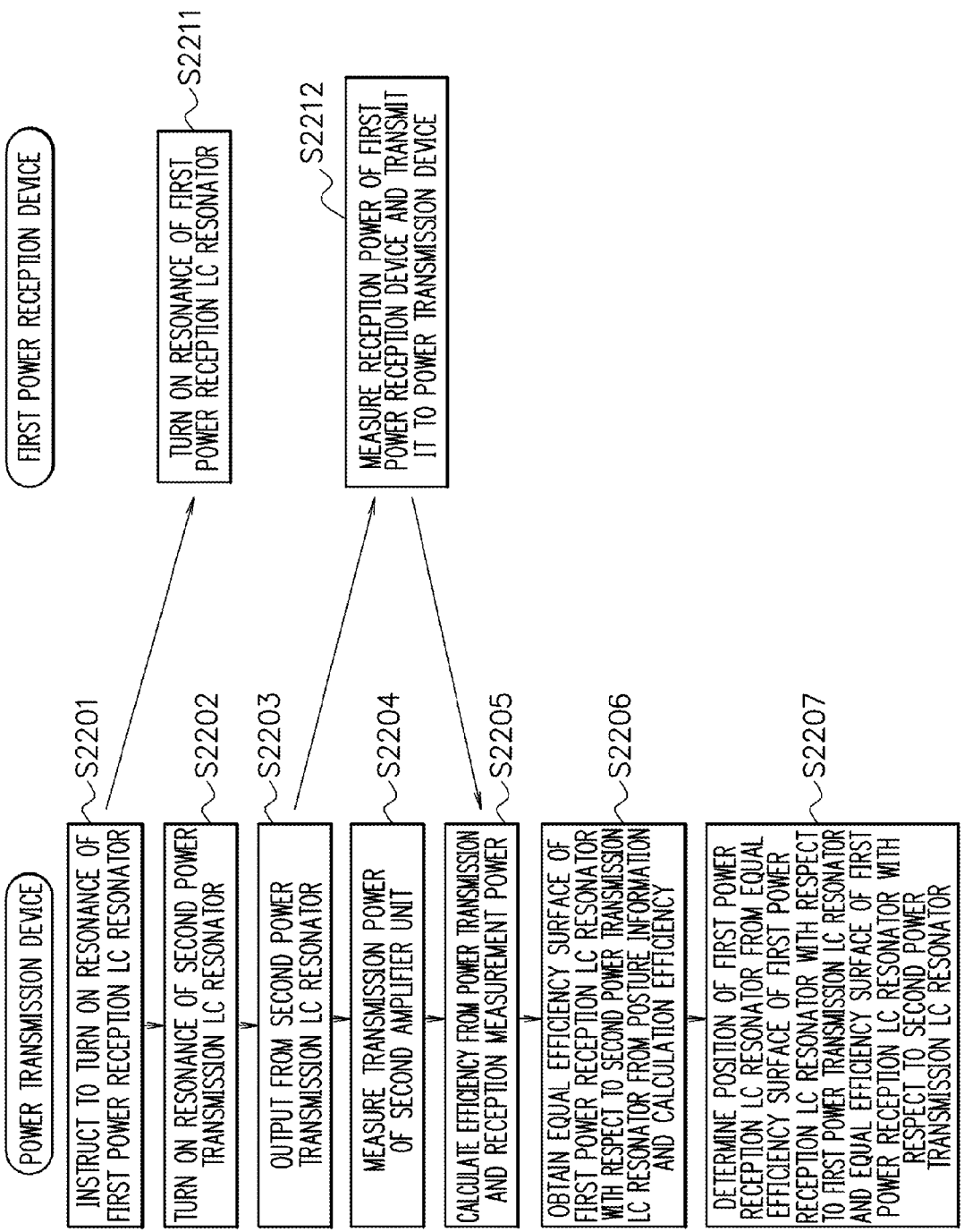

F I G. 23A
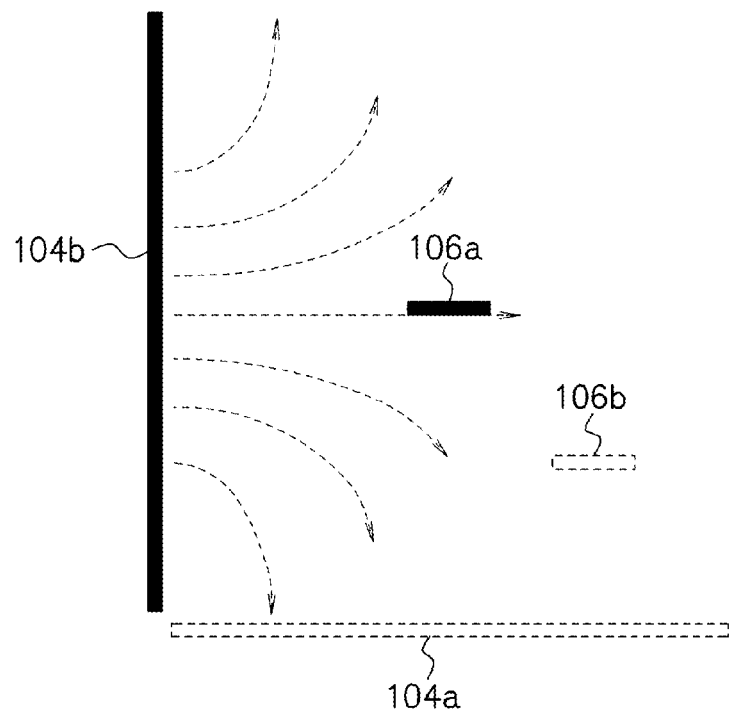
F I G. 23B
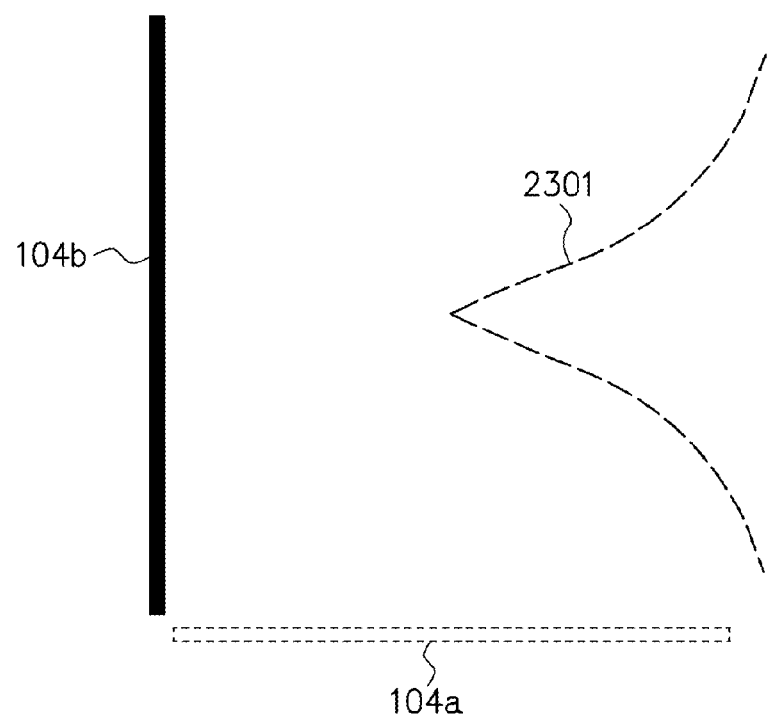

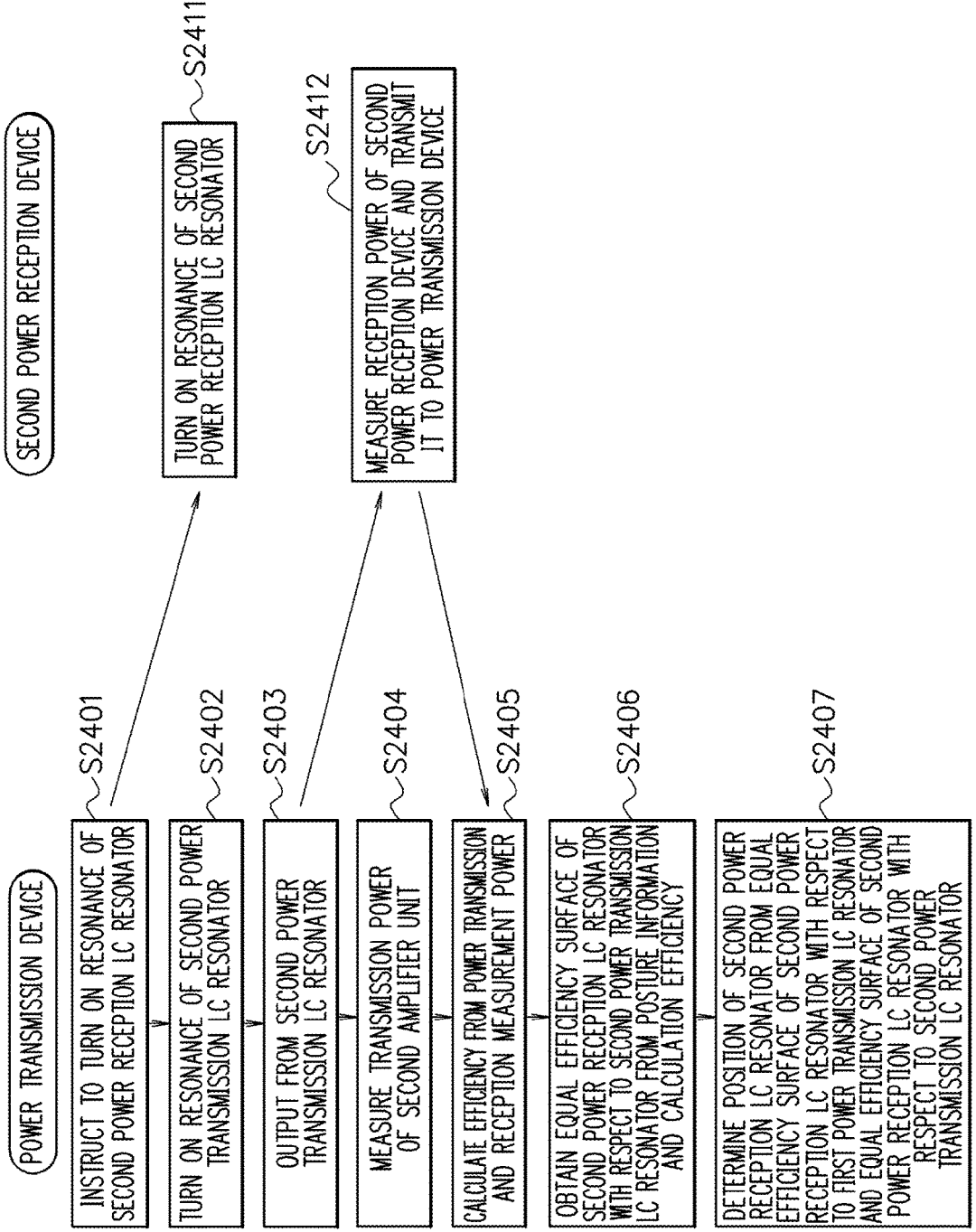
F I G. 24

POWER TRANSMISSION DEVICE AND POWER TRANSMISSION AND RECEPTION SYSTEM

CROSS-REFERENCE TO RELATED APPLICATIONS

This application is a continuation application of International Application PCT/JP2012/058697 filed on Mar. 30, 2012 and designated the U.S., which claims the benefit of priority of the prior Japanese Patent Application No. 2012-004011, filed on Jan. 12, 2012, the entire contents of which are incorporated herein by reference.

FIELD

The present invention relates to a power transmission device and a power transmission and reception system.

BACKGROUND

Non-contact power supply technology represented by electromagnetic induction is studied. The non-contact power supply technology is used in shavers, electric toothbrushes, and the like. In recent years, with presentation of magnetic field resonance technology being a trigger, non-contact power supply is eagerly studied more and more again.

Further, there is a known wireless power supply system which transmits power from a power transmission antenna to a power reception antenna by a wireless method, the wireless power supply system having a detecting unit detecting information related to a disposition state of the power reception antenna, a plurality of driving units driving a plurality of power transmission coils of the transmission antenna separately, and a control unit controlling an electric current flowing through the power transmission coils via the driving units based on at least the information related to the disposition state of the power reception antenna (see, for example, Patent Literature 1).

Further, there is known a non-contact power transmission device which has N (N is an integer of 2 or more) power transmission circuits and a control means controlling the N power transmission circuits, in which the transmission circuits have a transmission side LC tank circuit constituted of a capacitor and a power transmission coil which are connected in series and an oscillator circuit supplying power to this transmission side LC tank circuit, the power transmission coils of the N power transmission circuits are disposed in a matrix form, and the control means controls phases of signals generated by the respective oscillator circuits of the N power transmission circuits so that phases of changes in magnetic fields which arrive from at least two power transmission coils out of the power transmission coils of the N power transmission circuits are aligned in power reception coils of power reception circuits (see, for example, Patent Literature 2).

Patent Literature 1: Japanese Laid-open Patent Publication No. 2008-283789
Patent Literature 2: Japanese Laid-open Patent Publication No. 2011-199975

However, in Patent Literature 1, the description of specific means for obtaining information related to the disposition state of the power reception antenna is insufficient. Further, in Patent Literature 2, the description of specific method is insufficient for making the phases of changes in magnetic fields which arrive from at least two power transmission coils align in the power reception coils of the power reception circuits.

SUMMARY

A power transmission device has: a plurality of power transmission units which perform wireless power transmission of strong-coupling system; a communication unit which, when the plurality of power transmission units transmit power at different timings to a power reception device, receives from the power reception device a plurality of reception power values of power each received by the power reception device and posture information of the power reception device; and a control unit which calculates a plurality of efficiencies based on power values of power transmitted by the plurality of power transmission units and the received plurality of reception power values, obtains a plurality of equal efficiency surfaces with respect to the plurality of power transmission units based on the plurality of efficiencies and the received posture information, and estimates that the power reception device is present at a position where the plurality of equal efficiency surfaces intersect.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a block diagram illustrating a structural example of a high-frequency power supply circuit of FIG. 1.

FIG. 3A is a diagram illustrating the relation between a position and a posture of an LC resonator of the power reception device and a possibility of power reception.

FIG. 3B is a diagram illustrating the relation between a position and a posture of the LC resonator of the power reception device and a possibility of power reception.

FIG. 3C is a diagram illustrating the relation between a position and a posture of the LC resonator of the power reception device and a possibility of power reception.

FIG. 3D is a diagram illustrating the relation between a position and a posture of the LC resonator of the power reception device and a possibility of power reception.

FIG. 6 is a block diagram illustrating a structural example of a high-frequency power supply circuit of FIG. 5 that is phase adjustable.

FIG. 7A is a diagram illustrating an example in which the LC resonator of the power reception device has a posture at 135 degrees relative to the LC resonators of the power transmission device.

FIG. 7B is a diagram illustrating a power transmission and reception efficiency in the state of FIG. 7A.

FIG. 10A is a diagram for describing the method for estimating the position of the power reception device according to the embodiment.

FIG. 10B is a diagram for describing the method for estimating the position of the power reception device according to the embodiment.

FIG. 13 is a diagram illustrating a structural example of the power transmission device according to this embodiment.

FIG. 14 is a diagram illustrating a structural example of the power reception device according to this embodiment.

FIG. 16 is a diagram illustrating an example in which the power transmission device estimates positions of a plurality of power reception devices.

FIG. 17A is a circuit diagram illustrating a structural example of an LC resonator.

FIG. 17B is a circuit diagram illustrating a structural example of an LC resonator.

FIG. 17C is a circuit diagram illustrating a structural example of an LC resonator.

FIG. 17D is a circuit diagram illustrating a structural example of an LC resonator.

FIG. 18 is a flowchart illustrating an example of a processing procedure of the power transmission and reception system.

FIG. 19A is a diagram illustrating a state that resonance states of a first power transmission LC resonator and a first power reception LC resonator are on.

FIG. 19B is a diagram illustrating an equal efficiency surface of the first power reception LC resonator with respect to the first power transmission LC resonator.

FIG. 21A is a diagram illustrating a state that resonance states of the first power transmission LC resonator and a second power reception LC resonator are on.

FIG. 22 is a flowchart illustrating an example of a processing procedure of the power transmission and reception system.

FIG. 23A is a diagram illustrating a state that resonance states of a second power transmission LC resonator and the first power reception LC resonator are on.

FIG. 23B is a diagram illustrating an equal efficiency surface of the first power reception LC resonator with respect to the second power transmission LC resonator.

FIG. 24 is a flowchart illustrating an example of a processing procedure of the power transmission and reception system.

FIG. 25A is a diagram illustrating a state that resonance states of the second power transmission LC resonator and the second power reception LC resonator are on.

DESCRIPTION OF EMBODIMENT

Figure 1:
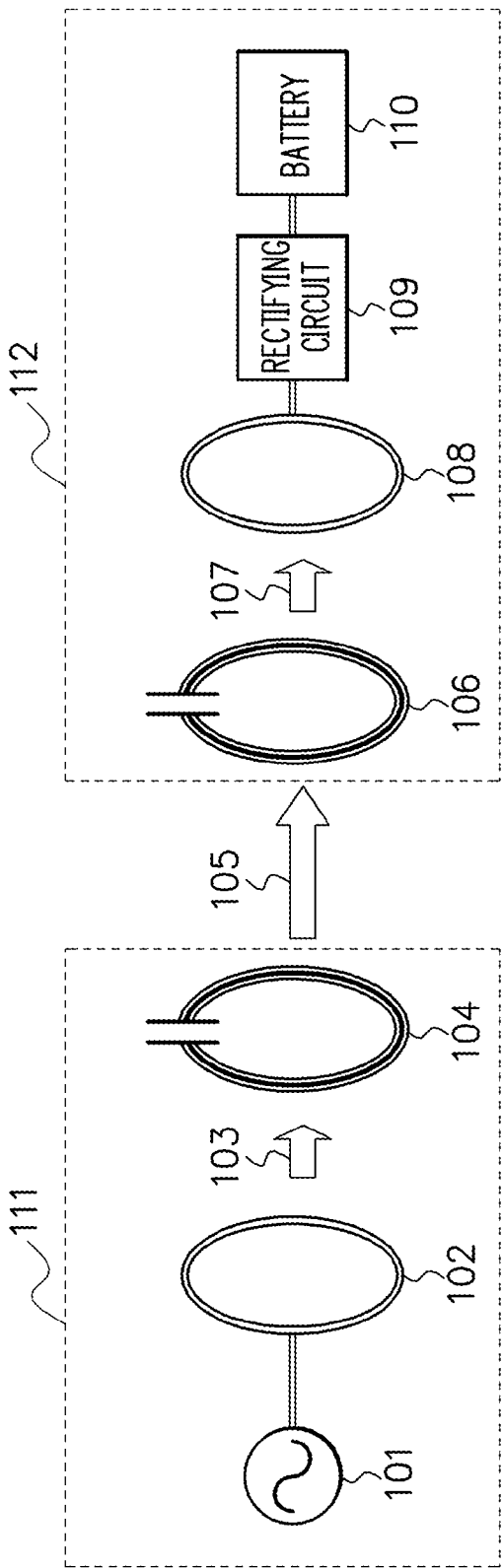
FIG. 1 is a diagram illustrating a structural example of a power transmission and reception system having a power transmission device and a power reception device.

FIG. 1 is a diagram illustrating a structural example of a power transmission and reception system having a power transmission device 111 and a power reception device 112. The power transmission device 111 has a high-frequency power supply circuit 101, a power transmission coil 102, and a power transmission LC resonator 104. The power reception device 112 has a power reception LC resonator 106, a power reception coil 108, a rectifying circuit 109, and a battery 110. The LC resonators 104 and 106 are a series connection circuit with a coil (inductor) and a capacitor, and a resonance frequency thereof is $1/\{2\times\pi\times\sqrt{(L\times C)}\}$. Here, L is inductance and C is capacitance. The power transmission device 111 can perform wireless power transmission to the power reception device 112. The high-frequency power supply circuit 101 applies a high-frequency voltage to the power transmission coil 102. Then, a magnetic field occurs in the power transmission coil 102, and electromagnetic induction 103 causes an electric current to flow through the LC resonator 104. Since the frequency of the voltage applied by the high-frequency power supply circuit 101 is the resonance frequency of $1/\{2\times\pi\times\sqrt{(L\times C)}\}$, the LC resonator 104 enters a resonance state. A magnetic field occurs in the LC resonator 104, an electric current flows through the LC resonator 106 by magnetic field resonance 105 with resonance frequency of $1/\{2\times\pi\times\sqrt{(L\times C)}\}$, and the LC resonator 106 enters a resonance state. Then, a magnetic field occurs in the LC resonator 106, and electromagnetic induction 107 causes an electric current to flow through the coil 108. The rectifying circuit 109 rectifies a voltage occurring in the coil 108, and supplies its rectified voltage to the battery 110. The battery 110 is charged by the supplied voltage. The power transmission device 111 is capable of wirelessly transmitting power to the power reception device 112 by the magnetic field resonance 105, to thereby charge the battery 110 of the power reception device 112.

Here, the coil 102 wirelessly transmits power to the LC resonator 104 by the electromagnetic induction 103. Next, the LC resonator 104 wirelessly transmits power to the LC resonator 106 by the magnetic field resonance 105. Next, the LC resonator 106 wirelessly transmits power to the coil 108 by the electromagnetic induction 107. Thus, the power transmission device 111 is capable of wirelessly transmitting power to the power reception device 112 by the magnetic field resonance 105.

Note that to the power reception device 112, the power transmission device 111 can perform wireless power transmission of strong-coupling system, which is not limited to the magnetic field resonance 105. The wireless power transmission of strong-coupling system includes electromagnetic induction, electric field induction, or electric field resonance besides the above magnetic field resonance 105. In the case of electromagnetic induction, for example, the LC resonators 104 and 106 may be eliminated. In this case, the coil 102 of the power transmission device 111 can perform wireless transmission to the coil 108 of the power reception device 112 by electromagnetic induction. Further, in the case of electric field induction or electric field resonance, an antenna or the like may be used to perform wireless transmission from the power transmission device 111 to the power reception device 112. The case where the power transmission device 111 performs wireless power transmission to the power reception device 112 by the magnetic field resonance 105 will be described below for example.

FIG. 2 is a block diagram illustrating a structural example of the high-frequency power supply circuit 101 of FIG. 1. The high-frequency power supply circuit 101 has an oscillating unit 201, an amplifier unit 202, and a matching unit 203. The oscillating unit 201 is, for example, a crystal oscillator element or a resonance oscillator circuit, or the like, and generates a voltage of desired frequency (for example, a few MHz) by oscillation. The amplifier unit 202 is an A to C class amplifier or a D to E class amplifier, or the like, amplifies the voltage generated by the oscillating unit 201 by a desired gain, and outputs a voltage of desired intensity (amplitude) via the matching unit 203. The matching unit 203 is a circuit having, for example, an inductor and a capacitor for performing impedance matching.

FIG. 3A to FIG. 3D are diagrams illustrating the relation between a position and a posture of the LC resonator 106 of the power reception device 112 and a possibility of power reception. By the LC resonator 104 of the power transmission device 111, a distribution of magnetic field 301 occurs. For the possibility of power reception, the relation between a position and a posture of the LC resonator 106 of the power reception device 112 and a direction of the magnetic field 301 is important.

In FIG. 3A, the position of the LC resonator 106 of the power reception device 112 is a center portion of the LC resonator 104 of the power transmission device 111, and the posture of the LC resonator 106 of the power reception device 112 is in parallel with the LC resonator 104 of the power transmission device 111. In this case, the magnetic field 301 crosses the LC resonator 106 of the power reception device 112 in a perpendicular direction, and thus a power reception efficiency becomes maximum and power reception is possible.

In FIG. 3B, the position of the LC resonator 106 of the power reception device 112 is a right end portion of the LC resonator 104 of the power transmission device 111, and the posture of the LC resonator 106 of the power reception device 112 is perpendicular to the LC resonator 104 of the power transmission device 111. In this case, the magnetic field 301 crosses the LC resonator 106 of the power reception device 112 in a substantially perpendicular direction, and thus power reception is possible.

In FIG. 3C, the position of the LC resonator 106 of the power reception device 112 is a center portion of the LC resonator 104 of the power transmission device 111, and the posture of the LC resonator 106 of the power reception device 112 is perpendicular to the LC resonator 104 of the power transmission device 111. In this case, the direction of the magnetic field 301 is in parallel with the LC resonator 106 of the power reception device 112, and thus a power reception efficiency becomes minimum and power reception is not possible.

In FIG. 3D, the position of the LC resonator 106 of the power reception device 112 is a right end portion of the LC resonator 104 of the power transmission device 111, and the posture of the LC resonator 106 of the power reception device 112 is at 45 degrees relative to the LC resonator 104 of the power transmission device 111. In this case, the direction of the magnetic field 301 is substantially in parallel with the LC resonator 106 of the power reception device 112, and thus power reception is not possible.

Figure 4A:
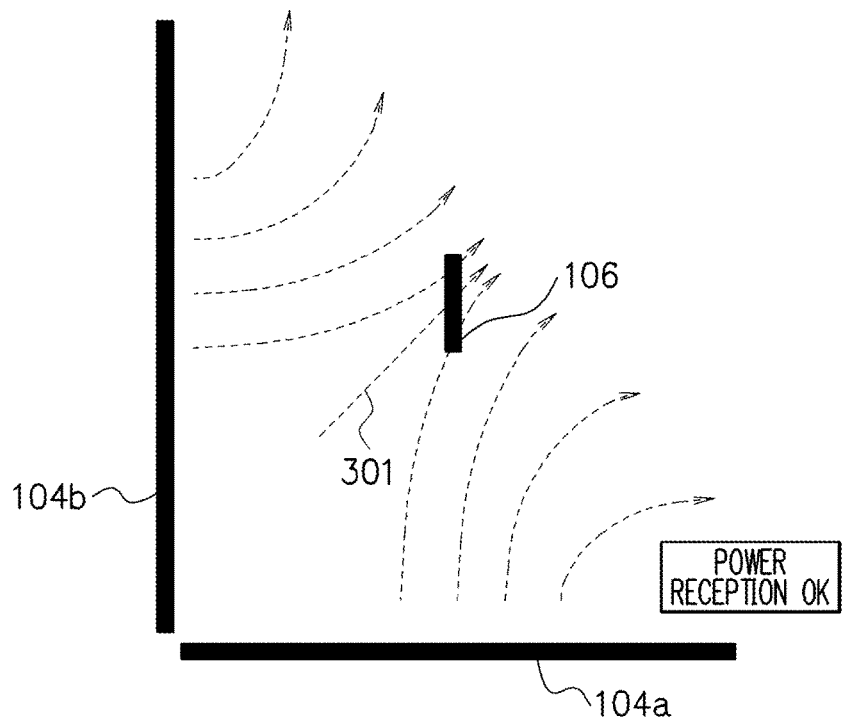
FIG. 4A is a diagram illustrating a possibility of power reception when two LC resonators of the power transmission device are used.
Figure 4B:
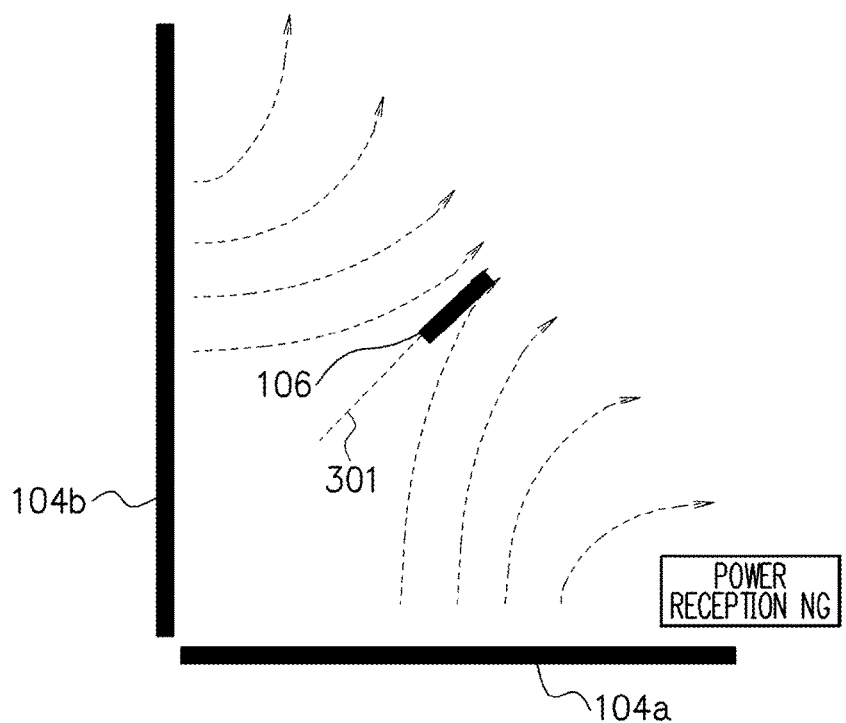
FIG. 4B is a diagram illustrating a possibility of power reception when the two LC resonators of the power transmission device are used.

FIG. 4A and FIG. 4B are diagrams illustrating a possibility of power reception when two LC resonators 104a and 104b of the power transmission device 111 are used. To the two LC resonators 104a and 104b, which correspond to the LC resonator 104 of FIG. 1, power may be transmitted by electromagnetic induction of one power transmission coil 102, or power may be transmitted by electromagnetic induction of two power transmission coils 102, respectively. Further, to the LC resonator 104a, power may be transmitted by electromagnetic induction of the power transmission coil 102, and to the LC resonator 104b, power may be transmitted by magnetic field resonance of the LC resonator 104a. For example, the LC resonator 104b is located in a perpendicular direction to the LC resonator 104a.

By the two LC resonators 104a and 104b of the power transmission device 111, a distribution of combined magnetic field 301 is generated. For the possibility of power reception, the relation between a position and a posture of the LC resonator 106 of the power reception device 112 and a direction of the magnetic field 301 is important.

In FIG. 4A, the position of the LC resonator 106 of the power reception device 112 is a center portion of the LC resonators 104a and 104b of the power transmission device 111, and the posture of the LC resonator 106 of the power reception device 112 is perpendicular to the LC resonator 104a of the power transmission device 111. In this case, the combined magnetic field 301 crosses the LC resonator 106 of the power reception device 112, and thus power reception is possible. That is, it is not possible to receive power by one LC resonator 104 as illustrated in FIG. 3C, but use of the two LC resonators 104a and 104b enables power reception.

In FIG. 4B, the position of the LC resonator 106 of the power reception device 112 is a center portion of the LC resonators 104a and 104b of the power transmission device 111, and the posture of the LC resonator 106 of the power reception device 112 is at 45 degrees relative to the LC resonators 104a and 104b of the power transmission device 111. In this case, the direction of the combined magnetic field 301 is substantially in parallel with the LC resonator 106 of the power reception device 112, and thus power reception is not possible.

Figure 5:
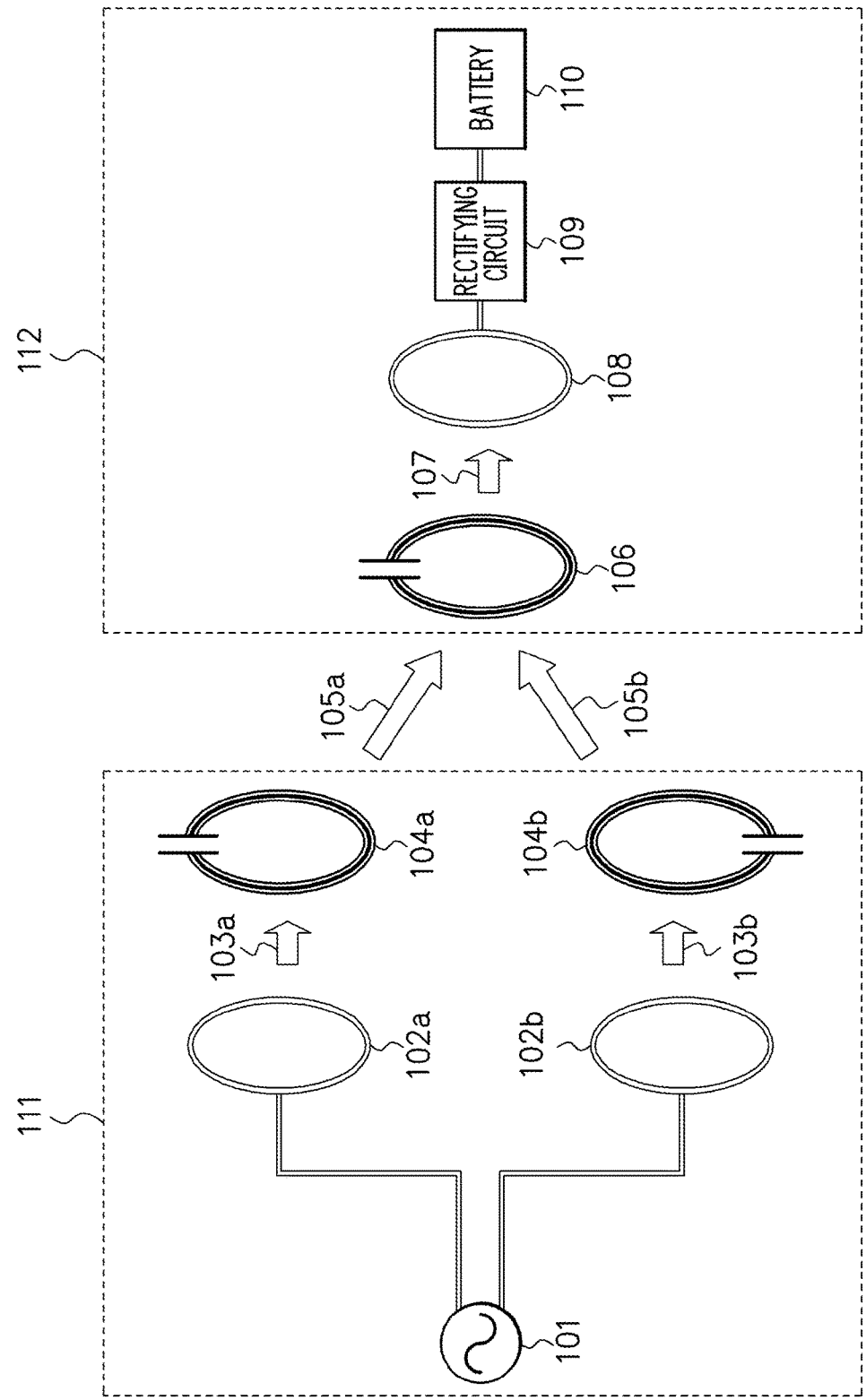
FIG. 5 is a diagram illustrating a structural example of a power transmission and reception system in which the power transmission device has two LC resonators.

FIG. 5 is a diagram illustrating a structural example of the power transmission and reception system in which the power transmission device 111 has two LC resonators 104a and 104b. Differences of FIG. 5 from FIG. 1 will be described below. The power transmission device 111 has two power transmission coils 102a, 102b and two LC resonators 104a, 104b. The two power transmission coils 102a, 102b correspond to the power transmission coil 102 of FIG. 1, and the two LC resonators 104a and 104b correspond to the LC resonator 104 of FIG. 1. A high-frequency power supply circuit 101 generates a voltage that is phase adjustable, and applies the voltage to the first power transmission coil 102a and the second power transmission coil 102b. The first power transmission coil 102a transmits power to the first LC resonator 104a by electromagnetic induction 103a. The second power transmission coil 102b transmits power to the second LC resonator 104b by electromagnetic induction 103b. The first LC resonator 104a transmits power to the LC resonator 106 by magnetic field resonance 105a, and the second LC resonator 104b transmits power to the LC resonator 106 by magnetic field resonance 105b. The power reception device 112 is the same as the power reception device 112 of FIG. 1.

FIG. 6 is a block diagram illustrating a structural example of the high-frequency power supply circuit 101 of FIG. 5 that is phase adjustable. The high-frequency power supply circuit 101 can apply a voltage to a plurality of power transmission coils 102a to 102c, and the like. An oscillating unit 201 generates a voltage of desired frequency by oscillation. Phase adjusting units 601b and 601c each adjust a phase of the voltage generated by the oscillating unit 201. A first amplifier unit 202a amplifies the voltage generated by the oscillating unit 201 by a first gain, and outputs the voltage of desired intensity (amplitude) to the first power transmission coil 102a via a first matching unit 203a. A second amplifier unit 202b amplifies the voltage adjusted in phase by the phase adjusting unit 601b by a second gain, and outputs the voltage of desired intensity (amplitude) to the second power transmission coil 102b via a second matching unit 203b. A third amplifier unit 202c amplifies the voltage adjusted in phase by the phase adjusting unit 601c by a third gain, and outputs the voltage of desired intensity (amplitude) to the third power transmission coil 102c via a third matching unit 203c. Input voltages of the three amplifier units 202a to 202c are the same in frequency and can be adjusted in phase by the phase adjusting units 601b and 601c.

FIG. 7A is a diagram illustrating an example in which the LC resonator 106 of the power reception device 112 has a posture (direction) at 135 degrees relative to the LC resonators 104a and 104b of the power transmission device 111, and FIG. 7B is a diagram illustrating a power transmission and reception efficiency in the state of FIG. 7A. A characteristic 701 represents a characteristic of the case of the power transmission device 111 having one LC resonator 104a but not having the LC resonator 104b and a characteristic of the case of the power transmission device 111 having one LC resonator 104b but not having the LC resonator 104a. A characteristic 702 represents a characteristic of the case of the power transmission device 111 having two LC resonators 104a and 104b. The horizontal axis represents a phase adjusted by the phase adjusting unit 601b, that is, a phase difference of magnetic fields of the LC resonators 104a and 104b. The vertical axis represents a power transmission and reception efficiency. In the characteristic 701, since the power transmission device 111 has one LC resonator 104a or 104b, the power transmission and reception efficiency is constant irrespective of phase. On the other hand, in the characteristic 702, since the power transmission device 111 has two LC resonators 104a and 104b, the power transmission and reception efficiency becomes maximum with a phase of zero degree, and the power transmission and reception efficiency becomes minimum with a phase of 180 degrees. By the phase adjusting unit 601b adjusting the phase, the characteristic 702 has better power transmission and reception efficiency than the characteristic 701.

Figure 8A:
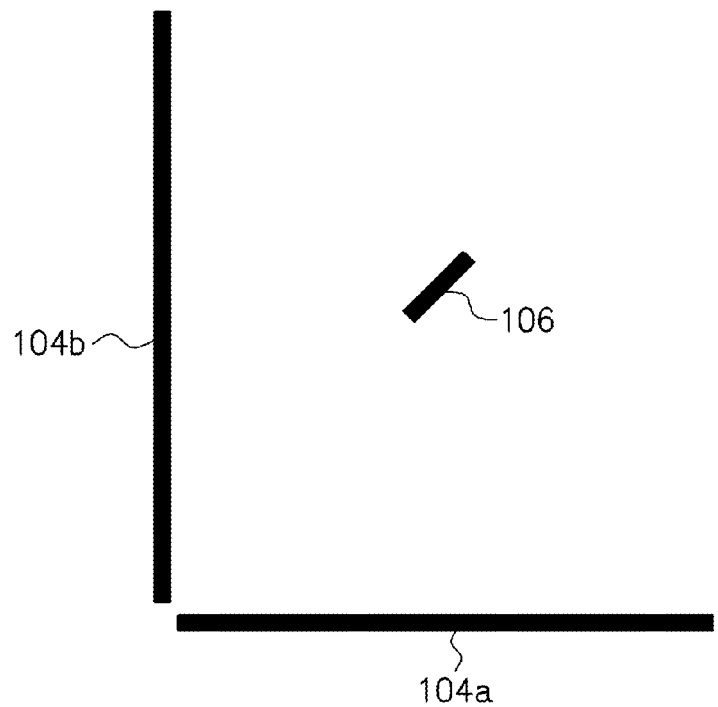
FIG. 8A is a diagram illustrating an example in which the LC resonator of the power reception device has a posture at 45 degrees relative to the LC resonators of the power transmission device.
Figure 8B:
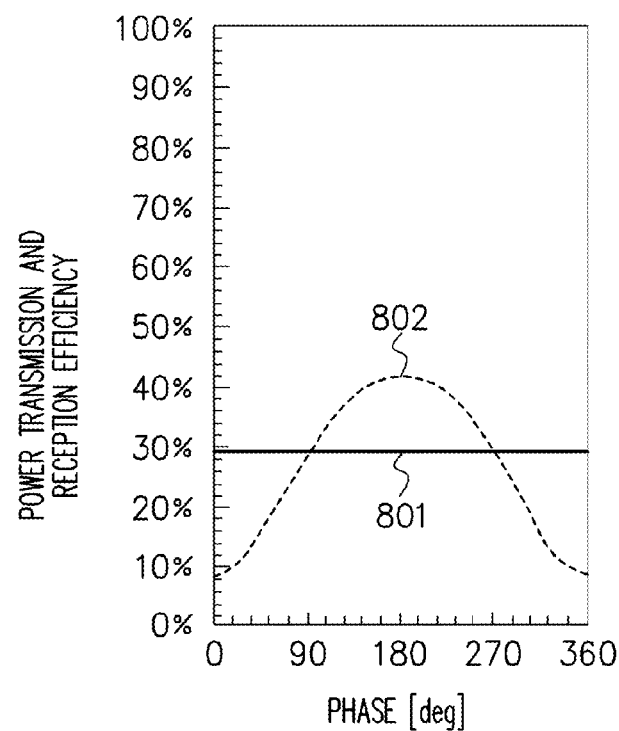
FIG. 8B is a diagram illustrating a power transmission and reception efficiency in the state of FIG. 8A.

FIG. 8A is a diagram illustrating an example in which the LC resonator 106 of the power reception device 112 has a posture (direction) at 45 degrees relative to the LC resonators 104a and 104b of the power transmission device 111, and FIG. 8B is a diagram illustrating a power transmission and reception efficiency in the state of FIG. 8A. A characteristic 801 represents a characteristic of the case of the power transmission device 111 having one LC resonator 104a but not having the LC resonator 104b, and a characteristic of the case of the power transmission device 111 having one LC resonator 104b but not having the LC resonator 104a. A characteristic 802 represents a characteristic of the case of the power transmission device 111 having two LC resonators 104a and 104b. The horizontal axis represents a phase adjusted by the phase adjusting unit 601b, that is, a phase difference of magnetic fields of the LC resonators 104a and 104b. The vertical axis represents a power transmission and reception efficiency. In the characteristic 801, since the power transmission device 111 has one LC resonator 104a or 104b, the power transmission and reception efficiency is constant irrespective of phase. On the other hand, in the characteristic 802, since the power transmission device 111 has two LC resonators 104a and 104b, the power transmission and reception efficiency becomes maximum with a phase of 180 degrees, and the power transmission and reception efficiency becomes minimum with a phase of zero degree. By the phase adjusting unit 601b adjusting the phase, the characteristic 802 has a better power transmission and reception efficiency than the characteristic 801.

Further, the phase that makes the power transmission and reception efficiency be maximum differs between FIG. 7B and FIG. 8B. That is, the phase that makes the power transmission and reception efficiency be maximum differs depending on the position and posture of the LC resonator 106 of the power reception device 112. The phase adjusting unit 601b can perform power transmission of a maximum power transmission and reception efficiency by controlling the phase according to the position and posture of the power reception device 112.

Further, other than the phase, changing the intensity of voltage by the gain of amplifier units 202a to 202c or the like of FIG. 6 also changes the distribution of the magnetic field 301 of FIG. 4A and FIG. 4B. Therefore, the power transmission device 111 can perform power transmission of the maximum power transmission and reception efficiency by controlling the phases of the phase adjusting units 601b, 601c, and so on and the intensities of the amplifier units 202a to 202c according to the position and posture of the power reception device 112. However, for this purpose, position and posture information of the power reception device 112 is needed. A method for obtaining the position and posture information of the power reception device 112 will be described below.

Figure 9A:
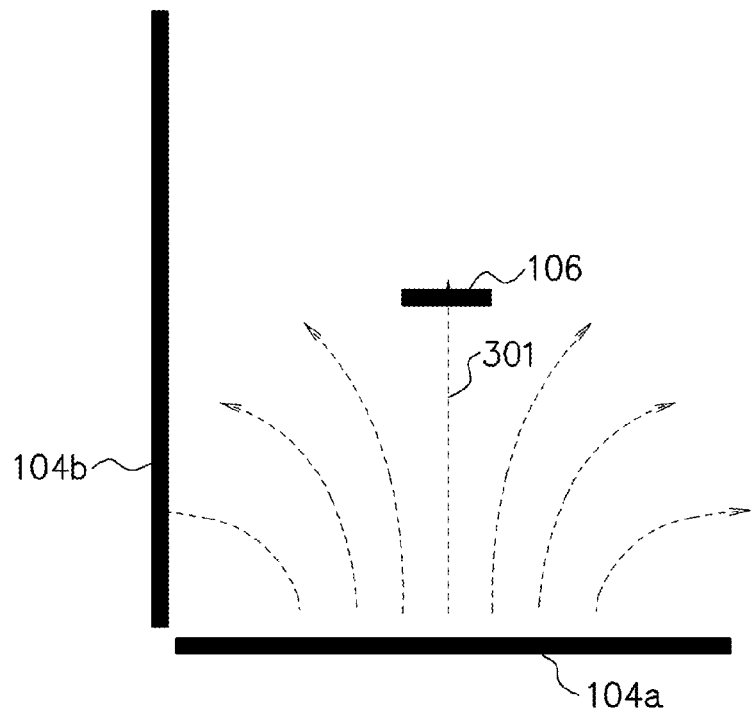
FIG. 9A is a diagram for describing a method for estimating the position of the power reception device according to an embodiment.

FIG. 9A, FIG. 9B, FIG. 10A, FIG. 10B, and FIG. 11 are diagrams for describing a method for estimating the position of the power reception device 112 according to the embodiment. First, as illustrated in FIG. 9A, the power transmission device 111 generates only the magnetic field 301 of the LC resonator 104a. In the LC resonator 106 of the power reception device 112, an electric current flows by magnetic field resonance, and the power reception device 112 receives power. Next, the power reception device 112 measures the received power and transmits a reception power value and posture information of the power reception device 112 to the power transmission device 111. Next, the power transmission device 111 measures the power value transmitted to the above power reception device 112 and calculates reception power value/transmission power value=efficiency. Next, the power transmission device 111 obtains a first equal efficiency surface 901 illustrated in FIG. 9B based on the above efficiency and posture information. The first equal efficiency surface 901 is a surface where the same efficiency as the above calculated efficiency can be obtained. Therefore, it is possible to estimate that the power reception device 112 is present somewhere on the first equal efficiency surface 901. For example, the LC resonator 106 of the power reception device 112 is located in a direction in parallel with the LC resonator 104a of the power transmission device 111, and thus has a high efficiency in a center portion of the LC resonator 104a. Accordingly, the first equal efficiency surface 901 is far from the LC resonator 104a in the center portion of the LC resonator 104a.

Next, as illustrated in FIG. 10A, the power transmission device 111 generates only the magnetic field 301 of the LC resonator 104b. In the LC resonator 106 of the power reception device 112, an electric current flows by magnetic field resonance, and the power reception device 112 receives power. Next, the power reception device 112 measures the received power and transmits a reception power value and posture information of the power reception device 112 to the power transmission device 111. Next, the power transmission device 111 measures the power value transmitted to the above power reception device 112 and calculates reception power value/transmission power value=efficiency. Next, the power transmission device 111 obtains a second equal efficiency surface 902 illustrated in FIG. 10B based on the above efficiency and posture information. The second equal efficiency surface 902 is a surface where the same efficiency as the above calculated efficiency can be obtained. Therefore, it is possible to estimate that the power reception device 112 is present somewhere on the second equal efficiency surface 902. For example, the LC resonator 106 of the power reception device 112 is located in a direction in parallel with the LC resonator 104b of the power transmission device 111, and thus has a low efficiency in a center portion of the LC resonator 104b. Accordingly, the second equal efficiency surface 902 is near to the LC resonator 104b in the center portion of the LC resonator 104b.

Figure 9B:
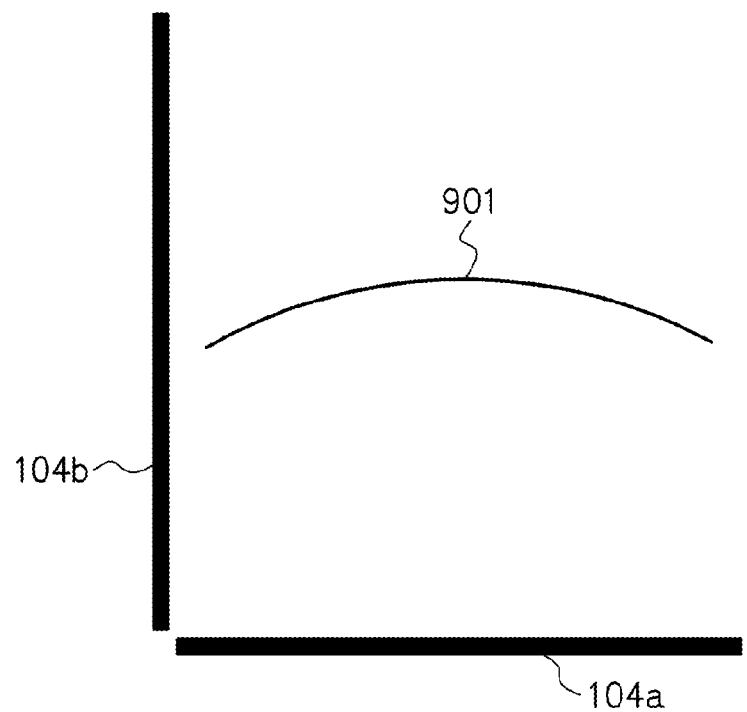
FIG. 9B is a diagram for describing the method for estimating the position of the power reception device according to the embodiment.
Figure 11:
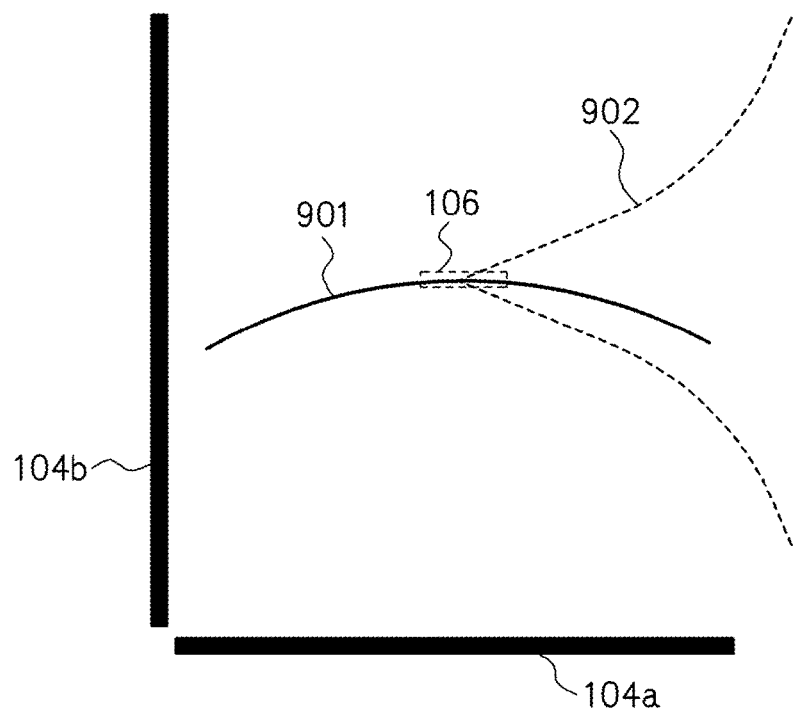
FIG. 11 is a diagram for describing the method for estimating the position of the power reception device according to the embodiment.

Next, as illustrated in FIG. 11, the power transmission device 111 estimates that the LC resonator 106 of the power reception device 112 is present at the position where the first equal efficiency surface 901 of FIG. 9B and the second equal efficiency surface 902 of FIG. 10B intersect. In this manner, the power transmission device 111 can estimate the position of the power reception device 112. Thereafter, the plurality of LC resonators 104a and 104b of the power transmission device 111 transmit power at the same timing to the power reception device 112 with the intensity and the phase controlled according to the above estimated position of the power reception device 112 and the above received posture information of the power reception device 112. In this manner, power transmission with the maximum power transmission and reception efficiency can be performed.

Figure 12:
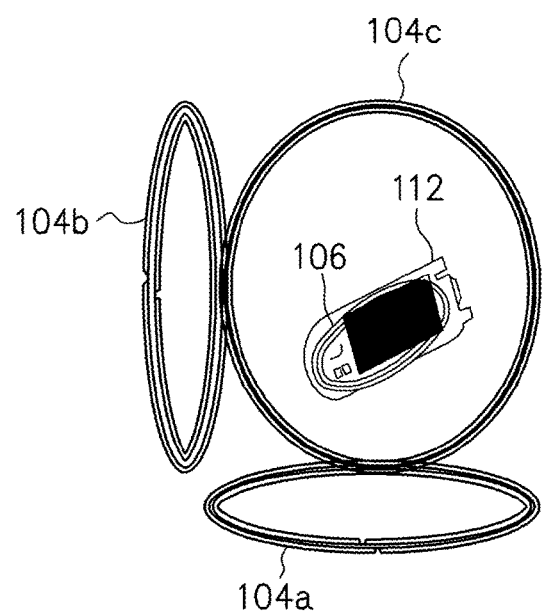
FIG. 12 is an overall view illustrating a structural example of the power transmission and reception system according to the embodiment.

FIG. 12 is an overall view illustrating a structural example of the power transmission and reception system according to the embodiment. The power transmission device 111 has three LC resonators 104a to 104c disposed in three-dimensional directions of XYZ axes. The LC resonator 104a is an LC resonator of XY plane, the LC resonator 104b is an LC resonator of YZ plane, and LC resonator 104c is an LC resonator of ZX plane. The power reception device 112 is a mobile terminal for example and has the LC resonator 106.

FIG. 13 is a diagram illustrating a structural example of the power transmission device 111 according to this embodiment. An oscillating unit 201 generates a voltage of desired frequency by oscillation. A phase adjusting unit 601b, to which a phase θb is inputted from a control unit 1301, outputs a voltage delayed by the phase θb relative to the voltage generated by the oscillating unit 201. A phase adjusting unit 601c, to which a phase θc is inputted from the control unit 1301, outputs a voltage delayed by the phase θc relative to the voltage generated by the oscillating unit 201.

A first amplifier unit 202a, to which an intensity (amplitude) A is inputted from the control unit 1301, amplifies the voltage generated by the oscillating unit 201 by a first gain A, and outputs a voltage of the intensity A to the power transmission coil 102a of XY plane via a first matching unit 203a. The power transmission coil 102a of XY plane, to which a voltage of A×sin(ωt) is inputted, transmits power to the LC resonator 104a by electromagnetic induction. The LC resonator 104a transmits power to the LC resonator 106 of the power reception device 112 by magnetic field resonance.

A second amplifier unit 202b, to which an intensity B is inputted from the control unit 1301, amplifies the voltage delayed by the phase adjusting unit 601b by a second gain B, and outputs voltage of the intensity B to the power transmission coil 102b of YZ plane via a second matching unit 203b. The power transmission coil 102b of YZ plane, to which a voltage of B×sin(ωt+θb) is inputted, transmits power to the LC resonator 104b by electromagnetic induction. The LC resonator 104b transmits power to the LC resonator 106 of the power reception device 112 by magnetic field resonance.

A third amplifier unit 202c, to which an intensity C is inputted from the control unit 1301, amplifies the voltage delayed by the phase adjusting unit 601c by a third gain C, and outputs a voltage of the intensity C to the power transmission coil 102c of ZX plane via a third matching unit 203c. The power transmission coil 102c of ZX plane, to which a voltage of C×sin(ωt+θc) is inputted, transmits power to the LC resonator 104c by electromagnetic induction. The LC resonator 104c transmits power to the LC resonator 106 of the power reception device 112 by magnetic field resonance.

The input voltages of the three power transmission coils 102a to 102c are the same in frequency, and intensities A to C and phases θb, θc thereof are adjustable.

The control unit 1301 can monitor output power of the first matching unit 203a and thereby obtain transmission power values of a first power transmission unit (power transmission coil and LC resonator) 102a, 104a, monitor output power of the second matching unit 203b and thereby obtain transmission power values of a second power transmission unit (power transmission coil and LC resonator) 102b, 104b, and monitor output power of the third matching unit 203c and thereby obtain transmission power values of a third power transmission unit (power transmission coil and LC resonator) 102c, 104c.

A communication unit 1302 wirelessly receives reception power values and posture information from the power reception device 112. The control unit 1301 calculates an efficiency based on the received reception power value and the above transmission power value, and obtains the first equal efficiency surface 901 of FIG. 9B and the second equal efficiency surface 902 of FIG. 10B based on the efficiency and posture information. Next, the control unit 1301 estimates that the power reception device 112 is present at the position where the equal efficiency surfaces 901 and 902 intersect, and controls the intensities A to C and the phases θB, θc based on the position and posture information of this power reception device 112.

FIG. 14 is a diagram illustrating a structural example of the power reception device 112 according to this embodiment. The LC resonator 106 receives power by magnetic field resonance from the LC resonators 104*a* to 104*c* of the power transmission device 111 of FIG. 13, and transmits power to the power reception coil 108 by electromagnetic induction. An electric current flows through the power reception coil 108, and a voltage occurs. A rectifying circuit and a DC-DC converter 1404 rectify the voltage which occurred in the power reception coil 108, performs level conversion of the rectified direct-current voltage, and supplies the direct-current voltage to a battery 1405. The battery 1405 is charged by this direct-current voltage. The power transmission device 111 can charge the battery 1405 of the power reception device 112 by the transmitted power.

A control unit 1402 monitors the reception power value which occurred in the power reception coil 108. Further, a triaxial acceleration sensor 1401 detects posture information of the power reception device 112 and outputs it to the control unit 1402. The control unit 1402 instructs a communication unit 1403 to transmit the reception power value and the posture information, and the communication unit 1403 wirelessly transmits the reception power value and the posture information to the power transmission device 111 of FIG. 13.

Figure 15:
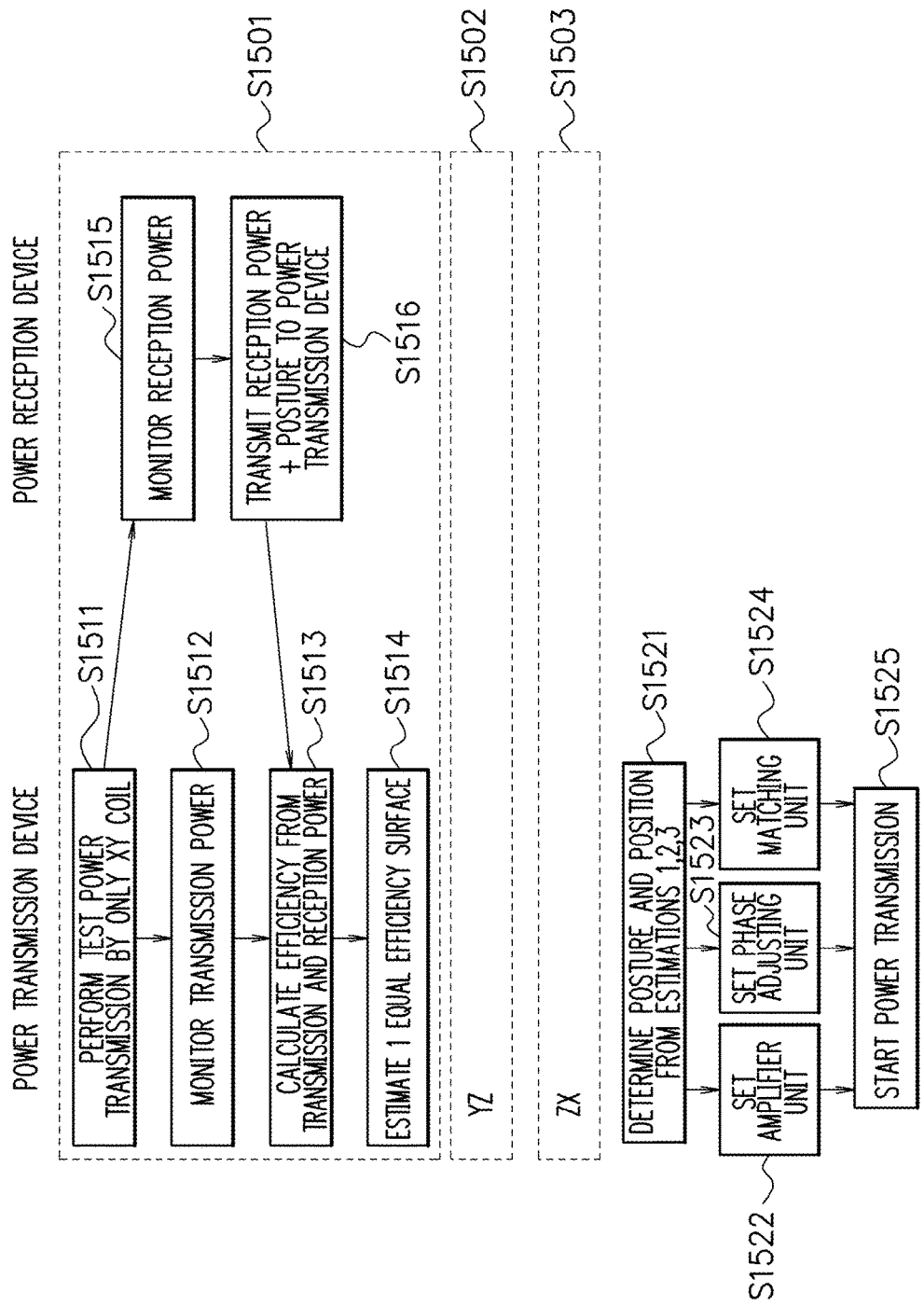
FIG. 15 is a flowchart illustrating a processing example of the power transmission and reception system according to this embodiment.

FIG. 15 is a flowchart illustrating a processing example of the power transmission and reception system according to this embodiment. Step S1501 is processing of the power transmission unit 102*a*, 104*a* of XY plane and has steps S1511 to S1516. Step S1502 is processing of the power transmission unit 102*b*, 104*b* of YZ plane, and has similar steps to steps S1511 to S1516. Step S1503 is processing of the power transmission unit 102*c*, 104*c* of ZX plane, and has similar steps to steps S1511 to S1516.

First, processing of the power transmission unit 102*a*, 104*a* of XY plane of step S1501 is performed. In step S1511, the power transmission device 111 performs by control of the control unit 1301 test power transmission with a predetermined intensity by using only the power transmission unit 102*a*, 104*a* of XY plane. Next, in step S1512, the power transmission device 111 monitors by the control unit 1301 output power of the first matching unit 203*a*, and obtains a transmission power value.

In step S1515, the power reception device 112 receives power from the power transmission device 111 by the LC resonator 106 and the power reception coil 108. Next, the power reception device 112 monitors by the control unit 1402 the reception power received by the power reception coil 108, and obtains a reception power value.

Next, in step S1516, the power reception device 112 detects posture information of the power reception device 112 by the triaxial acceleration sensor 1401. Next, the power reception device 112 transmits the above reception power value and the posture information to the power transmission device 111 by the control unit 1402 and the communication unit 1403.

Next, in step S1513, the power transmission device 111 receives by the communication unit 1302 the reception power value and the posture information from the power reception device 112. Next, the power transmission device 111 calculates by the control unit 1301 reception power value/transmission power value=efficiency. Next, the power transmission device 111 estimates by the control unit 1301 the first equal efficiency surface 901 as in FIG. 9B based on the above efficiency and the received posture information by using a table.

Next, processing of the power transmission unit 102*b*, 104*b* of YZ plane of step S1502 will be described. Step S1502 has similar processing to above steps S1511 to S1516. Processing of steps S1511 to S1516 in step S1502 will be described below.

In step S1511, the power transmission device 111 performs by control of the control unit 1301 test power transmission with a predetermined intensity by using only the power transmission unit 102*b*, 104*b* of YZ plane. Next, in step S1512, the power transmission device 111 monitors by the control unit 1301 output power of the second matching unit 203*b*, and obtains a transmission power value.

In step S1515, the power reception device 112 receives power from the power transmission device 111 by the LC resonator 106 and the power reception coil 108. Next, the power reception device 112 monitors by the control unit 1402 the reception power received by the power reception coil 108, and obtains a reception power value.

Next, in step S1516, the power reception device 112 detects posture information of the power reception device 112 by the triaxial acceleration sensor 1401. Next, the power reception device 112 transmits the above reception power value and the posture information to the power transmission device 111 by the control unit 1402 and the communication unit 1403.

Next, in step S1513, the power transmission device 111 receives by the communication unit 1302 the reception power value and the posture information from the power reception device 112. Next, the power transmission device 111 calculates by the control unit 1301 reception power value/transmission power value=efficiency. Next, the power transmission device 111 estimates by the control unit 1301 the second equal efficiency surface 902 as in FIG. 10B based on the above efficiency and the received posture information by using a table.

Next, processing of the power transmission unit 102*c*, 104*c* of ZX plane of step S1503 will be described. Step S1503 has similar processing to above steps S1511 to S1516. Processing of steps S1511 to S1516 in step S1503 will be described below.

In step S1511, the power transmission device 111 performs by control of the control unit 1301 test power transmission with a predetermined intensity by using only the power transmission unit 102*c*, 104*c* of ZX plane. Next, in step S1512, the power transmission device 111 monitors by the control unit 1301 output power of the third matching unit 203*c*, and obtains a transmission power value.

In step S1515, the power reception device 112 receives power from the power transmission device 111 by the LC resonator 106 and the power reception coil 108. Next, the power reception device 112 monitors by the control unit 1402 the reception power received by the power reception coil 108, and obtains a reception power value.

Next, in step S1516, the power reception device 112 detects posture information of the power reception device 112 by the triaxial acceleration sensor 1401. Next, the power reception device 112 transmits the above reception power value and the posture information to the power transmission device 111 by the control unit 1402 and the communication unit 1403.

Next, in step S1513, the power transmission device 111 receives by the communication unit 1302 the reception power value and the posture information from the power reception device 112. Next, the power transmission device 111 calculates by the control unit 1301 reception power value/transmission power value=efficiency. Next, the power transmission device 111 estimates by the control unit 1301 a third equal efficiency surface based on the above efficiency and the received posture information by using a table.

Next, in step S1521, the power transmission device 111 estimates by the control unit 1301 that the power reception device 112 is present at the position where the above first to third equal efficiency surfaces intersect. Next, by the control unit 1301, based on the estimated position of the power reception device 112 and the received posture information, the power transmission device 111 performs setting of the amplifier units 202a to 202c in step S1522, performs setting of the phase adjusting units 601b, 601c in step S1523, and performs setting of the matching units 203a to 203c in step S1524.

In step S1522, based on the estimated position of the power reception device 112 and the received posture information, the control unit 1301 sets the intensity A to the first amplifier unit 202a, sets the intensity B to the second amplifier unit 202b, and sets the intensity C to the third amplifier unit 202c. By setting the intensities A to C, the distribution of combined magnetic field is controlled, and power transmission with the maximum power transmission and reception efficiency becomes possible.

In step S1523, based on the estimated position of the power reception device 112 and the received posture information, the control unit 1301 sets phase θb to the phase adjusting unit 601b and sets θc to the phase adjusting unit 601c. By setting the phases θb and θC, the distribution of combined magnetic field is controlled, and power transmission with the maximum power transmission and reception efficiency becomes possible.

In step S1524, based on the estimated position of the power reception device 112 and the received posture information, the control unit 1301 sets a matching condition of the first matching unit 203a, sets a matching condition of the second matching unit 203b, and sets a matching condition of the third matching unit 203c. Output impedance of the power transmission device 111 changes according to the position and posture information of the power reception device 112. The matching units 203a to 203c are a matching circuit having, for example, an inductor and a capacitor for matching the output impedance. Therefore, the control unit 1301 matches the output impedance by controlling the value of inductor or capacitor in the matching units 203a to 203c based on the estimated position of the power reception device 112 and the received posture information, and power transmission with the maximum power transmission and reception efficiency becomes possible.

Specifically, in step S1522 and S1523, the control unit 1301 controls the intensities A to C and the phases θb, θc of power transmitted by the plurality of power transmission units based on a table storing the intensity and the phase corresponding to the position of the power reception device 112 and the posture information. Further, in step S1524, the control unit 1301 controls the matching conditions of the matching units 203a to 203c for the plurality of power transmission units based on a table storing matching conditions corresponding to the position and posture information of the power reception device 112. The above tables are generated in advance by performing calculation or actual measurement.

Next, in step S1525, the power transmission unit 102a, 104a of XY plane, the power transmission unit 102b, 104b of YZ plane, and the power transmission unit 102c, 104c of ZX plane transmit power at the same timing to the power reception device 112 with the intensities A to C and the phases θb, θc controlled according to the estimated position of the power reception device 112 and the received posture information. Thus, the power transmission device 111 transmits power to the power reception device 112 with the maximum power transmission and reception efficiency, and allows the battery 1405 of the power reception device 112 to receive power.

Note that to the power reception device 112, the power transmission device 111 can perform wireless power transmission of strong-coupling system, which is not limited to the magnetic field resonance. The wireless power transmission of strong-coupling system includes electromagnetic induction, electric field induction, or electric field resonance besides the above magnetic field resonance. In the case of electromagnetic induction, for example, the LC resonators 104a to 104c and 106 may be eliminated. The coils 102a to 102c of the power transmission device 111 can perform wireless power transmission to the coil 108 of the power reception device 112 by electromagnetic induction. Further, in the case of electric field induction or electric field resonance, an antenna or the like may be used to perform wireless transmission from the power transmission device 111 to the power reception device 112.

As described above, the power transmission unit 102a, 104a of XY plane, the power transmission unit 102b, 104b of YZ plane, and the power transmission unit 102c, 104c of ZX plane perform the wireless power transmission of strong-coupling system. The wireless power transmission of strong-coupling system includes wireless power transmission of electromagnetic induction, magnetic field resonance, electric field induction, or electric field resonance. The communication unit 1302 receives from the power reception device 112 three reception power values of power received by the power reception device 112 and the posture information of the power reception device 112 when the power transmission unit 102a, 104a of XY plane, the power transmission unit 102b, 104b of YZ plane, and the power transmission unit 102c, 104c of ZX plane transmit power to the power reception device 112 at different timings. The control unit 1301 calculates three efficiencies based on power values of power transmitted by the power transmission unit 102a, 104a of XY plane, the power transmission unit 102b, 104b of YZ plane, and the power transmission unit 102c, 104c of ZX plane and the received three reception power values, obtains three equal efficiency surfaces with respect to the power transmission unit 102a, 104a of XY plane, the power transmission unit 102b, 104b of YZ plane, and the power transmission unit 102c, 104c of ZX plane based on the three efficiencies and the received posture information, and estimates that the power reception device 112 is present at the position where the three equal efficiency surfaces intersect. Thereafter, the power transmission unit 102a, 104a of XY plane, the power transmission unit 102b, 104b of YZ plane, and the power transmission unit 102c, 104c of ZX plane transmit power at the same timing to the power reception device 112 with the intensities A to C and the phases θb, θc controlled according to the estimated position of the power reception device 112 and the received posture information.

According to this embodiment, the power transmission device 111 can perform sufficient power transmission to the power reception device by estimating the position of the power reception device 112 and receiving the posture information of the power reception device 112 even when the position and/or posture of the power reception device change or changes.

FIG. 16 is a diagram illustrating an example in which the power transmission device 111 estimates positions of a plurality of power reception devices 112. The case where the power transmission and reception system has one power transmission device 111 and two power reception devices 112 will be described below for example. The two power reception devices 112 each have the same structure as the power reception device 112 of FIG. 14, and are expressed as a first power reception device 112 and a second power reception device 112. Hereinafter, the power reception LC resonator 106 of the first power reception device 112 will be expressed as a first power reception LC resonator 106a, and the power reception LC resonator 106 of the second power reception device 112 will be expressed as a second power reception LC resonator 106b. The power transmission device 111 has, similarly to the above, a first power transmission LC resonator 104a and a second power transmission LC resonator 104b.

FIG. 17A to FIG. 17D are circuit diagrams illustrating structural examples of the first power transmission LC resonator 104a, the second power transmission LC resonator 104b, the first power reception LC resonator 106a, and the second power reception LC resonator 106b of FIG. 16. The LC resonators 104a, 104b, 106a, and 106b may be of any structure of FIG. 17A to FIG. 17D, and have a switch SW for turning on/off a resonance state.

In FIG. 17A, in each of the LC resonators 104a, 104b, 106a, and 106b, in a series connection circuit of a coil L and a capacitor C, the switch SW is connected between the coil L and the capacitor C. Turning on the switch SW causes the resonance state of each of the LC resonators 104a, 104b, 106a, and 106b to turn on, and turning off the switch SW causes the resonance state of each of the LC resonators 104a, 104b, 106a, and 106b to turn off.

In FIG. 17B, in each of the LC resonators 104a, 104b, 106a, and 106b, in a series connection circuit of a coil L and a capacitor C, the switch SW is connected in parallel with the capacitor C. Turning off the switch SW causes the resonance state of each of the LC resonators 104a, 104b, 106a, and 106b to turn on, and turning on the switch SW causes the resonance state of each of the LC resonators 104a, 104b, 106a, and 106b to turn off.

In FIG. 17C, in each of the LC resonators 104a, 104b, 106a, and 106b, in a series connection circuit of a coil L and a capacitor C, a series connection circuit of the switch SW and a resistor R is connected in parallel with the capacitor C. Turning off the switch SW causes the resonance state with a predetermined resonance frequency of each of the LC resonators 104a, 104b, 106a, and 106b to turn on, and turning on the switch SW causes the resonance state with a predetermined resonance frequency of each of the LC resonators 104a, 104b, 106a, and 106b to turn off.

In FIG. 17D, in each of the LC resonators 104a, 104b, 106a, and 106b, in a series connection circuit of a coil L and a capacitor C, a series connection circuit of the switch SW and a capacitor C1 is connected in parallel with the capacitor C. Turning off the switch SW causes the resonance state with a predetermined resonance frequency of each of the LC resonators 104a, 104b, 106a, and 106b to turn on, and turning on the switch SW causes the resonance state with a predetermined resonance frequency of each of the LC resonators 104a, 104b, 106a, and 106b to turn off.

FIG. 18, FIG. 20, FIG. 22, and FIG. 24 are flowcharts illustrating examples of processing procedures of the power transmission and reception system. The processing procedures of the power transmission and reception system will be described below with reference to the flowcharts of FIG. 18, FIG. 20, FIG. 22, and FIG. 24.

First, the power transmission and reception system performs processing of the flowchart of FIG. 18. The power transmission device 111 performs processing of steps S1801 to S1807, and the first power reception device 112 performs processing of steps S1811 and S1812. Here, in initialization processing, the power transmission device 111 controls the switches SW of the first power transmission LC resonator 104a and the second power transmission LC resonator 104b to turn off the resonance states of the first power transmission LC resonator 104a and the second power transmission LC resonator 104b. Similarly, the first power reception device 112 controls the switch SW of the first power reception LC resonator 106a to turn off the resonance state of the first power reception LC resonator 106a. Similarly, the second power reception device 112 controls the switch SW of the second power reception LC resonator 106b to turn off the resonance state of the second power reception LC resonator 106b.

First, in step S1801, the power transmission device 111 transmits to the first power reception device 112 information for instructing to turn on the resonance state of the first power reception LC resonator 106a and requesting posture information. Thereafter, the flow proceeds to steps S1802 and S1811.

In step S1811, the first power reception device 112 receives the above information from the power transmission device 111. Then, the first power reception device 112 controls the switch SW of the first power reception LC resonator 106a to turn on the resonance state of the first power reception LC resonator 106a. Then, the first power reception device 112 transmits posture information of the first power reception device 112 to the power transmission device 111 similarly to the above. Thereafter, the flow proceeds to step S1803.

In step S1802, the power transmission device 111 controls the switch SW of the first power transmission LC resonator 104a to turn on the resonance state of the first power transmission LC resonator 104a. Thus, as illustrated in FIG. 19A, the resonance states of the first power transmission LC resonator 104a and the first power reception LC resonator 106a become on, and the resonance states of the second power transmission LC resonator 104b and the second power reception LC resonator 106b become off. In this state, power transmission from the first power transmission LC resonator 104a to the first power reception LC resonator 106a becomes possible.

Next, in step S1803, the power transmission device 111 receives posture information of the first power reception device 112 from the first power reception device 112.

Next, in step S1804, the first amplifier unit 202a of the power transmission device 111 transmits power from the first power transmission LC resonator 104a similarly to FIG. 9A. Then, an electric current flows by magnetic field resonance through the first power reception LC resonator 106a of the first power reception device 112, and the first power reception device 112 receives power. Thereafter, the flow proceeds to steps S1805 and S1812.

In step S1812, the first power reception device 112 measures the received power and transmits a reception power value thereof to the power transmission device 111. Thereafter, the flow proceeds to step S1806.

In step S1805, the power transmission device 111 measures a power value of power transmitted by the above first amplifier unit 202a to the first power reception device 112 similarly to the above.

Next, in step S1806, the power transmission device 111 receives the reception power value of the first power reception device 112 from the first power reception device 112, and calculates reception power value/transmission power value=efficiency similarly to the above.

Next, in step S1807, the power transmission device 111 obtains an equal efficiency surface 1901 of the first power reception LC resonator 106a with respect to the first power transmission LC resonator 104a illustrated in FIG. 19B based on the above efficiency and posture information similarly to the above. The equal efficiency surface 1901 may be obtained based on a table stored in a memory, or may be obtained by calculation with a computing equation. It can be estimated that the first power reception LC resonator 106a of the first power reception device 112 is present somewhere on the equal efficiency surface 1901.

Figure 20:
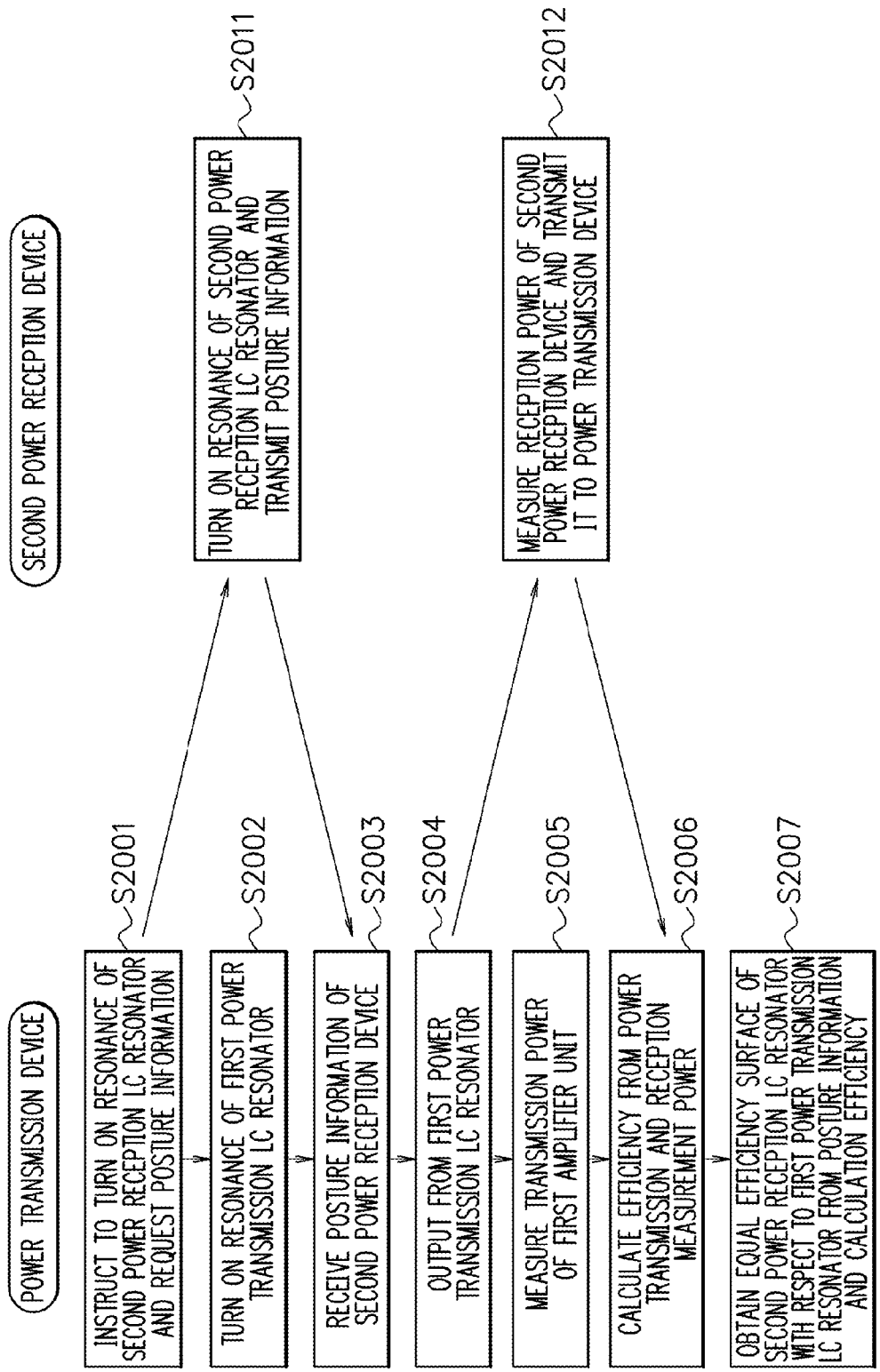
FIG. 20 is a flowchart illustrating an example of a processing procedure of the power transmission and reception system.

Next, the power transmission and reception system performs processing of the flowchart of FIG. 20. The power transmission device 111 performs processing of steps S2001 to S2007, and the second power reception device 112 performs processing of steps S2011 and S2012. Here, in initialization processing, the power transmission device 111 controls the switches SW of the first power transmission LC resonator 104a and the second power transmission LC resonator 104b to turn off the resonance states of the first power transmission LC resonator 104a and the second power transmission LC resonator 104b. Similarly, the first power reception device 112 controls the switch SW of the first power reception LC resonator 106a to turn off the resonance state of the first power reception LC resonator 106a. Similarly, the second power reception device 112 controls the switch SW of the second power reception LC resonator 106b to turn off the resonance state of the second power reception LC resonator 106b.

First, in step S2001, the power transmission device 111 transmits to the second power reception device 112 information for instructing to turn on the resonance state of the second power reception LC resonator 106b and requesting posture information. Thereafter, the flow proceeds to steps S2002 and S2011.

In step S2011, the second power reception device 112 receives the above information from the power transmission device 111. Then, the second power reception device 112 controls the switch SW of the second power reception LC resonator 106b to turn on the resonance state of the second power reception LC resonator 106b. Then, the second power reception device 112 transmits posture information of the second power reception device 112 to the power transmission device 111 similarly to the above. Thereafter, the flow proceeds to step S2003.

Figure 21A:
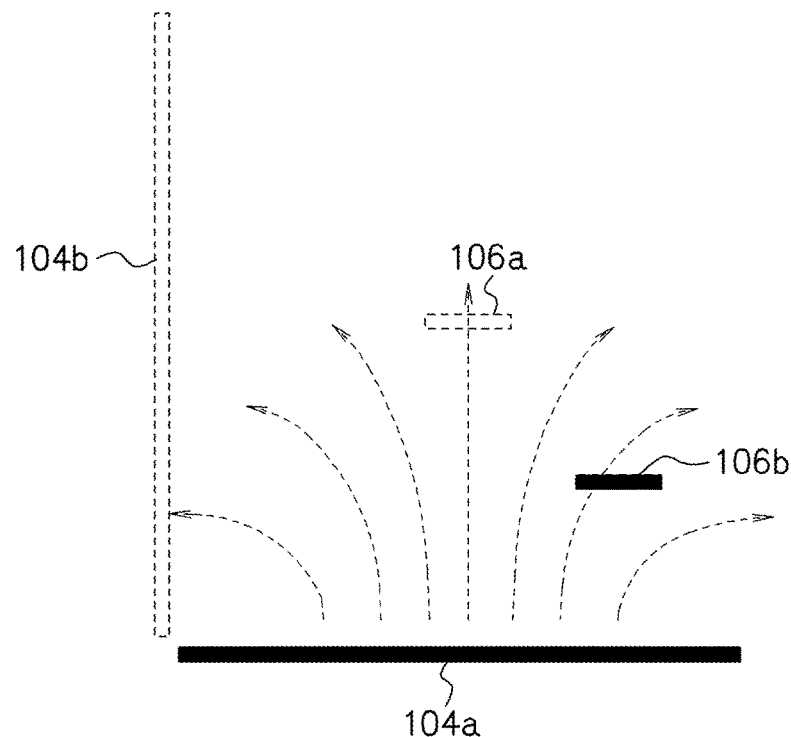

In step S2002, the power transmission device 111 controls the switch SW of the first power transmission LC resonator 104a to turn on the resonance state of the first power transmission LC resonator 104a. Thus, as illustrated in FIG. 21A, the resonance states of the first power transmission LC resonator 104a and the second power reception LC resonator 106b become on, and the resonance states of the second power transmission LC resonator 104b and the first power reception LC resonator 106a become off. In this state, power transmission from the first power transmission LC resonator 104a to the second power reception LC resonator 106b becomes possible.

Next, in step S2003, the power transmission device 111 receives posture information of the second power reception device 112 from the second power reception device 112.

Next, in step S2004, the first amplifier unit 202a of the power transmission device 111 transmits power from the first power transmission LC resonator 104a similarly to the above. Then, an electric current flows by magnetic field resonance through the second power reception LC resonator 106b of the second power reception device 112, and the second power reception device 112 receives power. Thereafter, the flow proceeds to steps S2005 and S2012.

In step S2012, the second power reception device 112 measures the received power and transmits a reception power value thereof to the power transmission device 111. Thereafter, the flow proceeds to step S2006.

In step S2005, the power transmission device 111 measures a power value of power transmitted by the above first amplifier unit 202a to the second power reception device 112 similarly to the above.

Next, in step S2006, the power transmission device 111 receives the reception power value of the second power reception device 112 from the second power reception device 112, and calculates reception power value/transmission power value=efficiency similarly to the above.

Figure 21B:
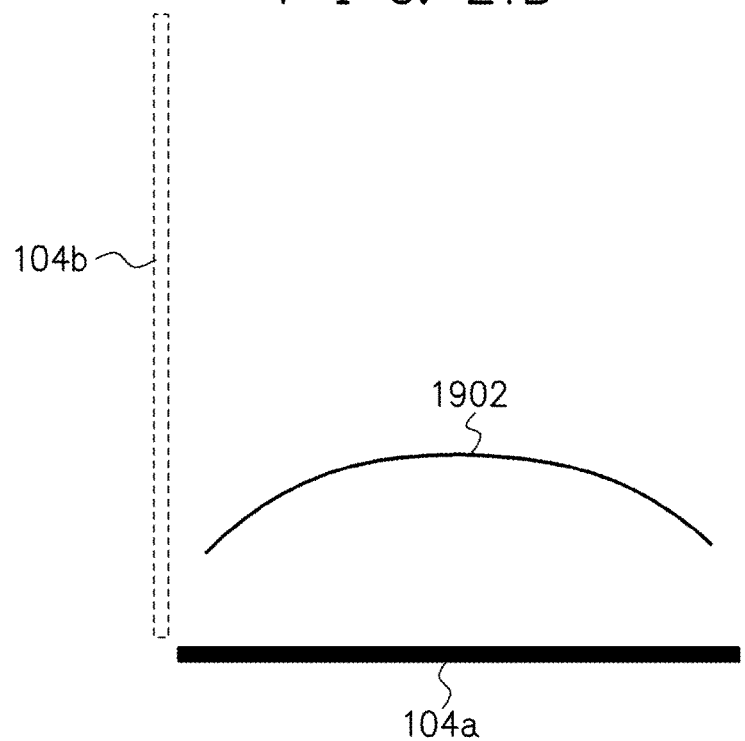
FIG. 21B is a diagram illustrating an equal efficiency surface of the second power reception LC resonator with respect to the first power transmission LC resonator.

Next, in step S2007, the power transmission device 111 obtains an equal efficiency surface 1902 of the second power reception LC resonator 106b with respect to the first power transmission LC resonator 104a illustrated in FIG. 21B based on the above efficiency and posture information similarly to the above. The equal efficiency surface 1902 may be obtained based on a table stored in a memory, or may be obtained by calculation with a computing equation. It can be estimated that the second power reception LC resonator 106b of the second power reception device 112 is present somewhere on the equal efficiency surface 1902.

Next, the power transmission and reception system performs processing of the flowchart of FIG. 22. The power transmission device 111 performs processing of steps S2201 to S2207, and the first power reception device 112 performs processing of steps S2211 and S2212. Here, in initialization processing, the power transmission device 111 controls the switches SW of the first power transmission LC resonator 104a and the second power transmission LC resonator 104b to turn off the resonance states of the first power transmission LC resonator 104a and the second power transmission LC resonator 104b. Similarly, the first power reception device 112 controls the switch SW of the first power reception LC resonator 106a to turn off the resonance state of the first power reception LC resonator 106a. Similarly, the second power reception device 112 controls the switch SW of the second power reception LC resonator 106b to turn off the resonance state of the second power reception LC resonator 106b.

First, in step S2201, the power transmission device 111 transmits to the first power reception device 112 information for instructing to turn on the resonance state of the first power reception LC resonator 106a. Thereafter, the flow proceeds to steps S2202 and S2211.

In step S2211, the first power reception device 112 receives the above information from the power transmission device 111. Then, the first power reception device 112 controls the switch SW of the first power reception LC resonator 106a to turn on the resonance state of the first power reception LC resonator 106a.

In step S2202, the power transmission device 111 controls the switch SW of the second power transmission LC resonator 104b to turn on the resonance state of the second power transmission LC resonator 104b. Thus, as illustrated in FIG. 23A, the resonance states of the second power transmission LC resonator 104b and the first power reception LC resonator 106a become on, and the resonance states of the first power transmission LC resonator 104a and the second power reception LC resonator 106b become off. In this state, power transmission from the second power transmission LC resonator 104b to the first power reception LC resonator 106a becomes possible.

Next, in step S2203, the second amplifier unit 202b of the power transmission device 111 transmits power from the second power transmission LC resonator 104b similarly to the above. Then, an electric current flows by magnetic field resonance through the first power reception LC resonator 106a of the first power reception device 112, and the first power reception device 112 receives power. Thereafter, the flow proceeds to steps S2204 and S2212.

In step S2212, the first power reception device 112 measures the received power and transmits a reception power value thereof to the power transmission device 111. Thereafter, the flow proceeds to step S2205.

In step S2204, the power transmission device 111 measures a power value of power transmitted by the above second amplifier unit 202b to the first power reception device 112 similarly to the above.

Next, in step S2205, the power transmission device 111 receives the reception power value of the first power reception device 112 from the first power reception device 112, and calculates reception power value/transmission power value=efficiency similarly to the above.

Next, in step S2206, the power transmission device 111 obtains an equal efficiency surface 2301 of the first power reception LC resonator 106a with respect to the second power transmission LC resonator 104b illustrated in FIG. 23B based on the above efficiency and posture information similarly to the above. The equal efficiency surface 2301 may be obtained based on a table stored in a memory, or may be obtained by calculation with a computing equation. It can be estimated that the first power reception LC resonator 106a of the first power reception device 112 is present somewhere on the equal efficiency surface 2301.

Figure 26:
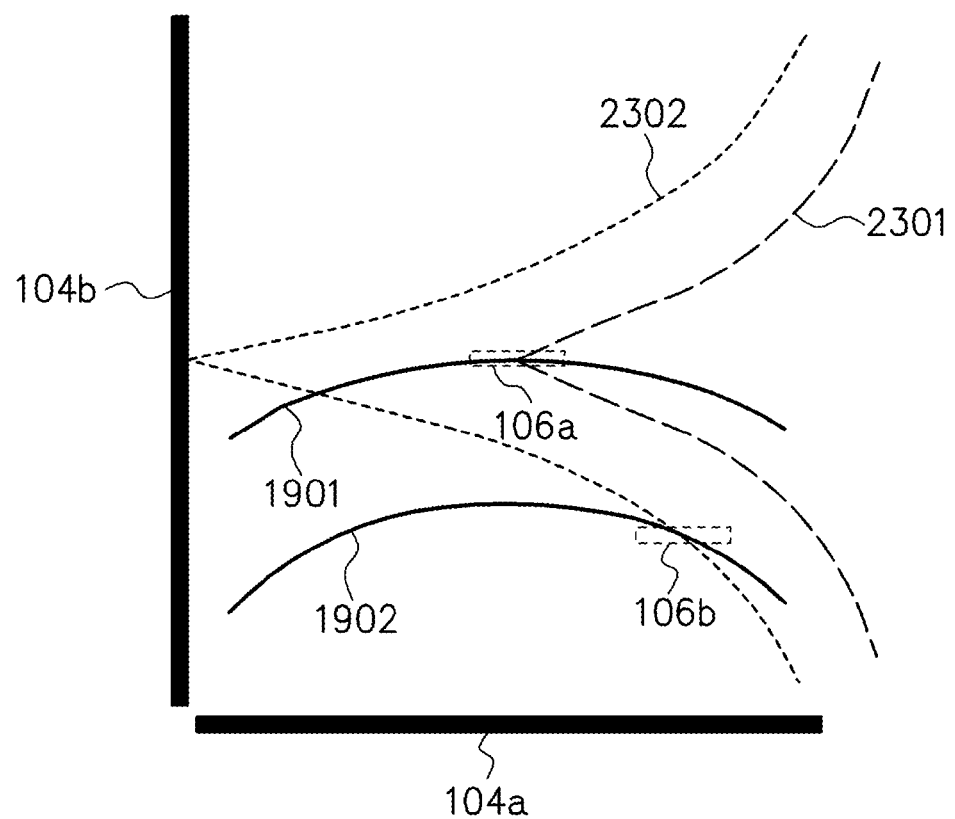
FIG. 26 is a diagram illustrating a method for estimating positions of the first and second power reception devices.

Next, in step S2207, the power transmission device 111 estimates that the first power reception LC resonator 106a of the first power reception device 112 is present at the position where the equal efficiency surface 1901 of FIG. 19B and the equal efficiency surface 2301 of FIG. 23B intersect as illustrated in FIG. 26. Thus, the power transmission device 111 can determine the position of the first power reception device 112.

Next, the power transmission and reception system performs processing of the flowchart of FIG. 24. The power transmission device 111 performs processing of steps S2401 to S2407, and the second power reception device 112 performs processing of steps S2411 and S2412. Here, in initialization processing, the power transmission device 111 controls the switches SW of the first power transmission LC resonator 104a and the second power transmission LC resonator 104b to turn off the resonance states of the first power transmission LC resonator 104a and the second power transmission LC resonator 104b. Similarly, the first power reception device 112 controls the switch SW of the first power reception LC resonator 106a to turn off the resonance state of the first power reception LC resonator 106a. Similarly, the second power reception device 112 controls the switch SW of the second power reception LC resonator 106b to turn off the resonance state of the second power reception LC resonator 106b.

First, in step S2401, the power transmission device 111 transmits to the second power reception device 112 information for instructing to turn on the resonance state of the second power reception LC resonator 106b. Thereafter, the flow proceeds to steps S2402 and S2411.

In step S2411, the second power reception device 112 receives the above information from the power transmission device 111. Then, the second power reception device 112 controls the switch SW of the second power reception LC resonator 106b to turn on the resonance state of the second power reception LC resonator 106b.

Figure 25A:
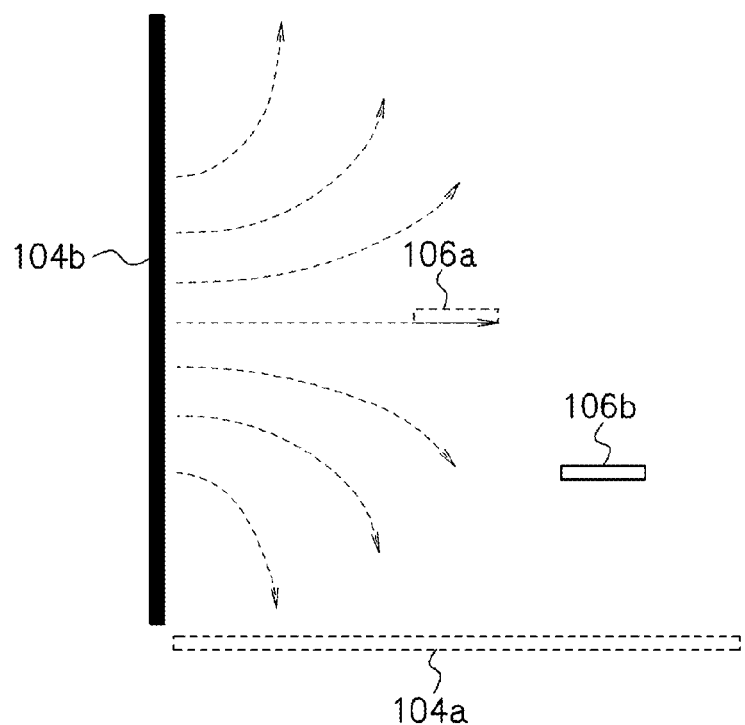

In step S2402, the power transmission device 111 controls the switch SW of the second power transmission LC resonator 104b to turn on the resonance state of the second power transmission LC resonator 104b. Thus, as illustrated in FIG. 25A, the resonance states of the second power transmission LC resonator 104b and the second power reception LC resonator 106b become on, and the resonance states of the first power transmission LC resonator 104a and the first power reception LC resonator 106a become off. In this state, power transmission from the second power transmission LC resonator 104b to the second power reception LC resonator 106b becomes possible.

Next, in step S2403, the second amplifier unit 202b of the power transmission device 111 transmits power from the second power transmission LC resonator 104b similarly to the above. Then, an electric current flows by magnetic field resonance through the second power reception LC resonator 106b of the second power reception device 112, and the second power reception device 112 receives power. Thereafter, the flow proceeds to steps S2404 and S2412.

In step S2412, the second power reception device 112 measures the received power and transmits a reception power value thereof to the power transmission device 111. Thereafter, the flow proceeds to step S2405.

In step S2404, the power transmission device 111 measures a power value of power transmitted by the above second amplifier unit 202b to the second power reception device 112 similarly to the above.

Next, in step S2405, the power transmission device 111 receives the reception power value of the second power reception device 112 from the second power reception device 112, and calculates reception power value/transmission power value=efficiency similarly to the above.

Figure 25B:
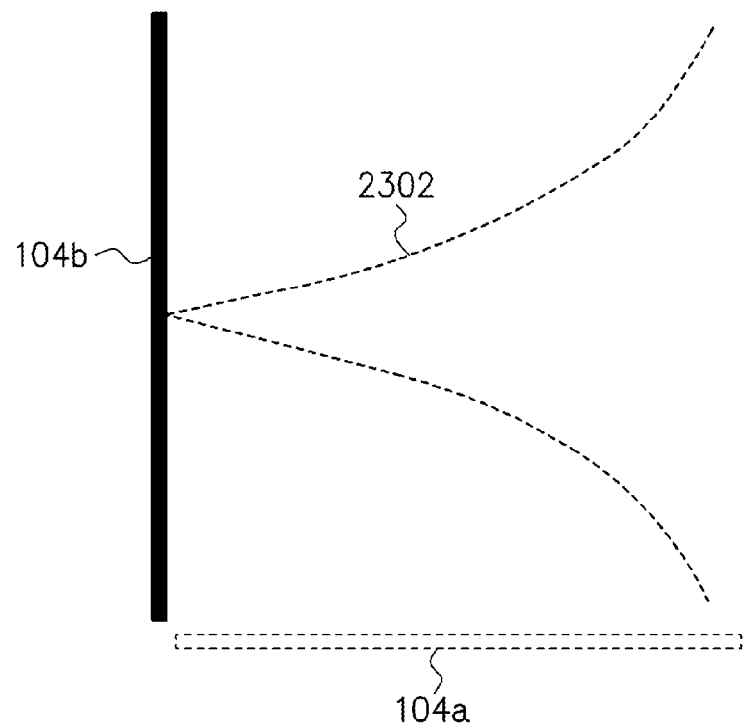
FIG. 25B is a diagram illustrating an equal efficiency surface of the second power reception LC resonator with respect to the second power transmission LC resonator.

Next, in step S2406, the power transmission device 111 obtains an equal efficiency surface 2302 of the second power reception LC resonator 106b with respect to the second power transmission LC resonator 104b illustrated in FIG. 25B based on the above efficiency and posture information similarly to the above. The equal efficiency surface 2302 may be obtained based on a table stored in a memory, or may be obtained by calculation with a computing equation. It can be estimated that the second power reception LC resonator 106b of the second power reception device 112 is present somewhere on the equal efficiency surface 2302.

Next, in step S2407, the power transmission device 111 estimates that the second power reception LC resonator 106b of the second power reception device 112 is present at the position where the equal efficiency surface 1902 of FIG. 21B and the equal efficiency surface 2302 of FIG. 25B intersect as illustrated in FIG. 26. Thus, the power transmission device 111 can determine the position of the second power reception device 112.

Thereafter, the power transmission LC resonators 104a and 104b of the power transmission device 111 transmit power to the first and second power reception devices 112 with intensities and phases controlled according to the above estimated positions of the first and second power reception devices 112 and the posture information of the first and second power reception devices 112. Thus, the power transmission device 111 can perform power transmission with the maximum power transmission and reception efficiency to the first and second power reception devices 112.

As described above, when the plurality of power transmission units transmit power to the plurality of power reception devices 112 respectively at respective different timings, the communication unit 1302 of the power transmission device 111 receives from the plurality of power reception devices 112 a plurality of reception power values of power received by the plurality of power reception devices 112 respectively and the posture information of the plurality of power reception devices 112. The control unit 1301 of the power transmission device 111 obtains the plurality of equal efficiency surfaces 1901, 1902, 2301, 2302 with respect to each of the plurality of power reception devices 112 and estimates that the plurality of power reception devices 112 are present respectively at positions where the pluralities of equal efficiency surfaces 1901, 1902, 2301, 2302 intersect.

According to this embodiment, the power transmission device 111 estimates the respective positions of the plurality of power reception devices 112 and transmits power with appropriate intensities and phases respectively to the plurality of power reception devices 112. Thus, the power transmission device 111 can transmit power with the maximum power transmission and reception efficiency to the plurality of power reception devices 112. Note that in the above, the example of the case of two power reception devices 112 has been described, but the invention can also be applied similarly to three or more power reception devices 112.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

It is possible to perform sufficient power transmission to a power reception device even when a position and/or a posture of the power reception device changes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power transmission device, comprising:
    a plurality of power transmission units which perform wireless power transmission of strong-coupling system;
    a communication unit which, when the plurality of power transmission units transmit power at different timings to a power reception device, receives from the power reception device a plurality of reception power values of power each received by the power reception device and posture information of the power reception device; and
    a control unit which calculates a plurality of efficiencies based on power values of power transmitted by the plurality of power transmission units and the received plurality of reception power values, obtains a plurality of equal efficiency surfaces with respect to the plurality of power transmission units based on the plurality of efficiencies and the received posture information, and estimates that the power reception device is present at a position where the plurality of equal efficiency surfaces intersect.

2. The power transmission device according to claim 1, wherein the plurality of power transmission units transmit power at a same timing to the power reception device with an intensity and a phase controlled according to the estimated position of the power reception device and the received posture information.

3. The power transmission device according to claim 2, wherein the control unit controls the intensities and the phases of power transmitted by the plurality of power transmission units based on a table storing the intensity and the phase corresponding to the position of the power reception device and the posture information.

4. The power transmission device according to claim 1, wherein the plurality of power transmission units each have a matching unit for performing impedance matching,
    wherein the control unit controls matching conditions of the matching units of the plurality of power transmission units according to the estimated position of the power reception device and the received posture information.

5. The power transmission device according to claim 4, wherein the control unit controls the matching conditions of the matching units of the plurality of power transmission units based on a table storing the matching conditions corresponding to the position of the power reception device and the posture information.

6. The power transmission device according to claim 1, wherein the plurality of power transmission units perform wireless power transmission by magnetic field resonance or electric field resonance.

7. The power transmission device according to claim 1, wherein
    when the plurality of power transmission units transmit power to the plurality of power reception devices respectively at respective different timings, the communication unit receives from the plurality of power reception devices a plurality of reception power values of power received by the plurality of power reception devices respectively and the posture information of the plurality of power reception devices, and
    the control unit obtains the plurality of equal efficiency surfaces with respect to each of the plurality of power reception devices, and estimates that the plurality of power reception devices are present respectively at positions where the pluralities of equal efficiency surfaces intersect.

8. A power transmission and reception system, comprising:
    a power transmission device; and
    a power reception device, wherein
    the power transmission device comprises:
    a plurality of power transmission units which perform wireless power transmission of strong-coupling system;
    a communication unit which, when the plurality of power transmission units transmit power at different timings to the power reception device, receives from the power reception device a plurality of reception power values of power each received by the power reception device and posture information of the power reception device; and
    a control unit which calculates a plurality of efficiencies based on power values of power transmitted by the plurality of power transmission units and the received plurality of reception power values, obtains a plurality of equal efficiency surfaces with respect to the plurality of power transmission units based on the plurality of efficiencies and the received posture information, and estimates that the power reception device is present at a position where the plurality of equal efficiency surfaces intersect, and the power reception device comprises:
a communication unit which transmits a plurality of reception power values of power received at different timings from the plurality of power transmission units and posture information of the power reception device to the power transmission device.

9. The power transmission and reception system according to claim 8, wherein the power reception device comprises a triaxial acceleration sensor for detecting posture information of the power reception device.

10. The power transmission and reception system according to claim 8, wherein the plurality of power transmission units transmit power at a same timing to the power reception device with an intensity and a phase controlled according to the estimated position of the power reception device and the received posture information.

11. The power transmission and reception system according to claim 8, further comprising a plurality of power reception devices, wherein
when the plurality of power transmission units transmit power to the plurality of power reception devices respectively at respective different timings, the communication unit receives from the plurality of power reception devices a plurality of reception power values of power received by the plurality of power reception devices respectively and the posture information of the power reception devices, and
the control unit obtains the plurality of equal efficiency surfaces with respect to each of the plurality of power reception devices, and estimates that the plurality of power reception devices are present respectively at positions where the pluralities of equal efficiency surfaces intersect.

* * * * *